US012679447B2

(12) United States Patent
Gaudszun et al.

(10) Patent No.: US 12,679,447 B2
(45) Date of Patent: Jul. 14, 2026

(54) TORQUES FOR APPLICATION OF AUTOMATED STEERING OF VEHICLES

(71) Applicant: QUALCOMM Incorporated, San Diego, CA (US)

(72) Inventors: Benjamin Gaudszun, Bibertal OT Schneckenhofen (DE); Sibylle Tanja Reber, Gröbenzell (DE); Jan Veen, Hallbergmoos (DE); Yavor Nikolaev Trasiev, Mölndal (SE); Joao Paulo Jansch Porto, Philadelphia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 18/963,442

(22) Filed: Nov. 27, 2024

(65) Prior Publication Data

US 2026/0145731 A1     May 28, 2026

(51) Int. Cl.
| | |
|---|---|
| B62D 5/04 | (2006.01) |
| B60W 10/20 | (2006.01) |
| B62D 6/00 | (2006.01) |
| B62D 6/02 | (2006.01) |

(52) U.S. Cl.
CPC ........... B62D 5/0463 (2013.01); B60W 10/20 (2013.01); B62D 6/007 (2013.01); B62D 6/02 (2013.01); B60W 2510/202 (2013.01); B60W 2520/10 (2013.01); B60W 2540/21 (2020.02); B60W 2556/10 (2020.02); B60W 2556/65 (2020.02)

(58) Field of Classification Search
CPC ........ B62D 5/0463; B62D 6/007; B62D 6/02; B60W 10/20; B60W 2510/202; B60W 2520/10; B60W 2540/21; B60W 2556/10; B60W 2556/65

USPC ......................................... 701/41, 42, 43, 44
See application file for complete search history.

(56) References Cited

U.S. PATENT DOCUMENTS

| | | | | |
|---|---|---|---|---|
| 11,801,890 B2 * | 10/2023 | Kim | ..................... | B62D 15/025 |
| 12,116,000 B2 * | 10/2024 | Kim | ................... | B60W 60/005 |
| 2019/0202494 A1 | 7/2019 | Itou et al. | | |
| 2019/0359247 A1 | 11/2019 | Tsubaki | | |
| 2020/0130727 A1 * | 4/2020 | Kim | ..................... | B62D 15/025 |

(Continued)

FOREIGN PATENT DOCUMENTS

| | | |
|---|---|---|
| CN | 115107802 A | 9/2022 |
| EP | 3203340 A1 | 8/2017 |

*Primary Examiner* — Hai H Huynh
(74) *Attorney, Agent, or Firm* — Holland & Hart LLP

(57) ABSTRACT

Some examples of the techniques described herein may include a feature where a torque of a steering wheel provides a seamless transition from automated driving to manual steering. For example, automated driving may remain active while the driver interacts with the steering wheel and may take control when the driver releases the steering wheel. The torque of the steering wheel may feel similar to the supportive torque of power steering, including an additional torque weight to indicate that automated driving is still active. Thus, a smooth transition between automated driving and manual driving may be provided. In some approaches, an automated steering controller may impart a torque on the steering wheel that is modeled as a combination of a characteristic power steering supportive torque, a second torque that may vary based on vehicle speed, or a third torque that may vary based on a degree of steering.

20 Claims, 12 Drawing Sheets

(56)         References Cited

U.S. PATENT DOCUMENTS

2024/0034408  A1      2/2024  Suzuki
2025/0319906  A1 *   10/2025  Wei .................. B60W 60/0053

* cited by examiner

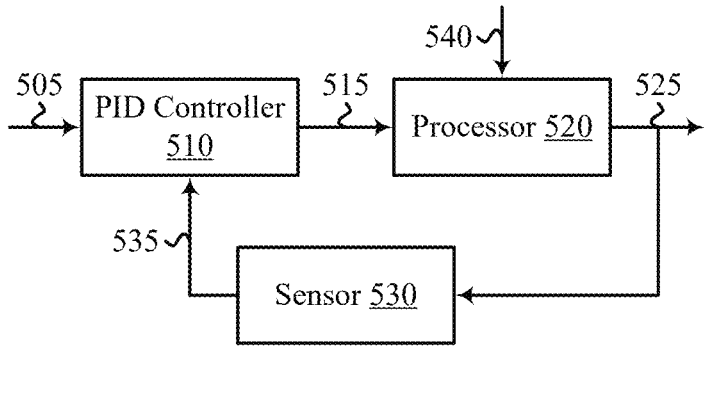
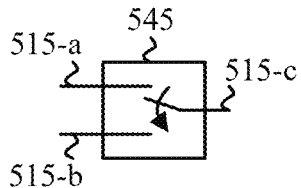
FIG. 5

720

705

700

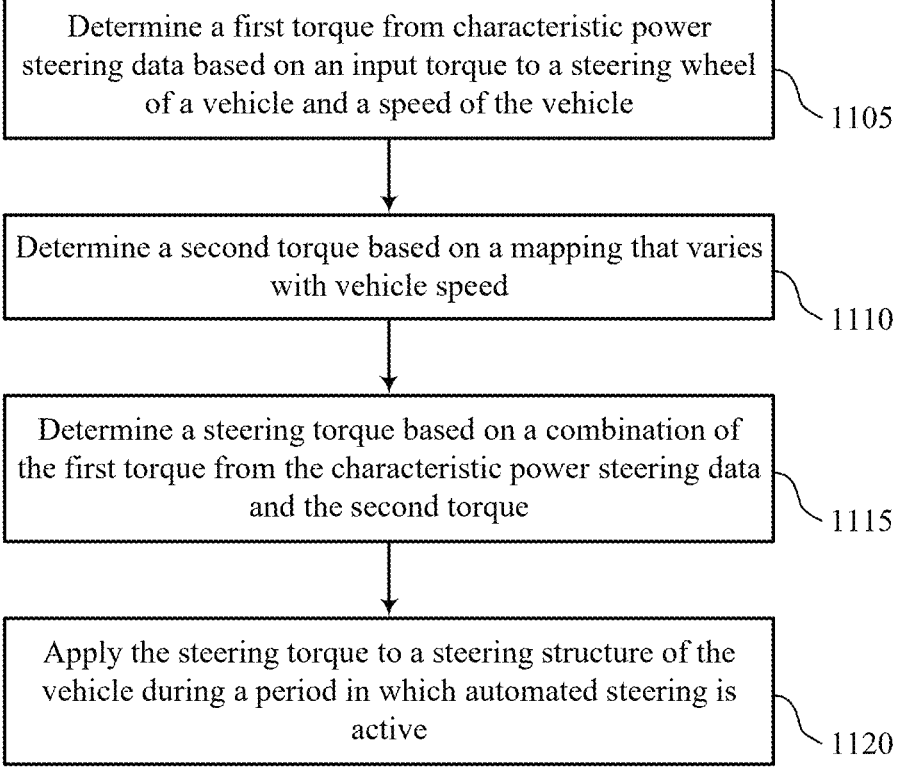

Determine a first torque from characteristic power steering data based on an input torque to a steering wheel of a vehicle and a speed of the vehicle
~ 1105

Determine a second torque based on a mapping that varies with vehicle speed
~ 1110

Determine a steering torque based on a combination of the first torque from the characteristic power steering data and the second torque
~ 1115

Apply the steering torque to a steering structure of the vehicle during a period in which automated steering is active
~ 1120

TORQUES FOR APPLICATION OF AUTOMATED STEERING OF VEHICLES

FIELD OF TECHNOLOGY

The following relates to automated steering, including torques for application of automated steering of vehicles.

BACKGROUND

Some vehicles utilize an advanced driver assistance system (ADAS) to assist an operator with driving or vehicle control tasks. ADAS technologies have continuously evolved. Some fully mechanical systems, such as basic cruise control, have been augmented or superseded by electronic and computer-controlled systems, which may include features such as electronic stability control or automatic braking systems. Additional advancements in sensor technology and data processing have enabled the rise of adaptive systems such as adaptive cruise control and lane departure alerting systems. ADASs have had an impact on automotive safety and transportation efficiency, and future advances in ADAS will likely continue to enhance safety and driver convenience, and spur the industry toward achieving full vehicle autonomy.

SUMMARY

The systems, methods, and devices of this disclosure each have several innovative aspects, no single one of which is solely responsible for the desirable attributes disclosed herein.

A method by an apparatus is described. The method may include determining a first torque from characteristic power steering data based on an input torque to a steering wheel of a vehicle and a speed of the vehicle, determining a second torque based on a mapping that varies with vehicle speed, determining a steering torque based on a combination of the first torque from the characteristic power steering data and the second torque, and applying the steering torque to a steering structure of the vehicle during a period in which automated steering is active. The steering torque that is based on the second torque may indicate that the automated steering is active.

An apparatus is described. The apparatus may include one or more memory and one or more processors electronically coupled to the one or more memory. The one or more processors may be configured to determine a first torque from characteristic power steering data based on an input torque to a steering wheel of a vehicle and a speed of the vehicle, determine a second torque based on a mapping that varies with vehicle speed, determine a steering torque based on a combination of the first torque from the characteristic power steering data and the second torque, and apply the steering torque to a steering structure of the vehicle during a period in which automated steering is active. The steering torque that is based on the second torque may indicate that the automated steering is active.

Another apparatus is described. The apparatus may include means for determining a first torque from characteristic power steering data based on an input torque to a steering wheel of a vehicle and a speed of the vehicle, means for determining a second torque based on a mapping that varies with vehicle speed, means for determining a steering torque based on a combination of the first torque from the characteristic power steering data and the second torque, and means for applying the steering torque to a steering structure of the vehicle during a period in which automated steering is active. The steering torque that is based on the second torque may indicate that the automated steering is active.

A non-transitory computer-readable medium storing code is described. The code may include instructions executable by one or more processors to determine a first torque from characteristic power steering data based on an input torque to a steering wheel of a vehicle and a speed of the vehicle, determine a second torque based on a mapping that varies with vehicle speed, determine a steering torque based on a combination of the first torque from the characteristic power steering data and the second torque, and apply the steering torque to a steering structure of the vehicle during a period in which automated steering is active. The steering torque that is based on the second torque may indicate that the automated steering is active.

Some examples of the method, apparatus, and non-transitory computer-readable medium described herein may further include operations, features, means, or instructions for determining a third torque based on a mapping that varies with a degree of steering, where the combination for determining the steering torque further includes the third torque.

Some examples of the method, apparatus, and non-transitory computer-readable medium described herein may further include operations, features, means, or instructions for obtaining an input via an input device for adjusting the mapping that varies with vehicle speed, the mapping that varies with the degree of steering, or the combination for determining the steering torque and adjusting the mapping that varies with vehicle speed, the mapping that varies with the degree of steering, or the combination based on the input.

In some examples of the method, apparatus, and non-transitory computer-readable medium described herein, the input is a speech signal, and some examples of the method, apparatus, and non-transitory computer-readable medium described herein may further include operations, features, means, or instructions for executing an artificial intelligence or machine learning (AI/ML) model based on the speech signal to determine an adjustment to the mapping that varies with vehicle speed, to the mapping that varies with the degree of steering, or to the combination.

Some examples of the method, apparatus, and non-transitory computer-readable medium described herein may further include operations, features, means, or instructions for obtaining information from a device that may be external to the vehicle and adjusting the second torque, the third torque, or the steering torque based on the information.

In some examples of the method, apparatus, and non-transitory computer-readable medium described herein, the information may be obtained from a second vehicle that may be spatially ahead of the vehicle, the information indicating a driver interaction with the second vehicle, and adjusting the second torque, the third torque, or the steering torque includes reducing the second torque, the third torque, or the steering torque to reduce an automated steering deactivation threshold.

In some examples of the method, apparatus, and non-transitory computer-readable medium described herein, the information may be received from a second vehicle that may be spatially ahead of the vehicle, the information indicative of an emergency maneuver, and adjusting the second torque, the third torque, or the steering torque includes increasing the second torque, the third torque, or the steering torque to increase an automated steering deactivation threshold.

Some examples of the method, apparatus, and non-transitory computer-readable medium described herein may further include operations, features, means, or instructions for detecting the input torque and determining whether to deactivate the automated steering based on the input torque and the combination of the second torque and the first torque.

Some examples of the method, apparatus, and non-transitory computer-readable medium described herein may further include operations, features, means, or instructions for determining whether to deactivate the automated steering includes determining whether the input torque meets or exceeds an automated steering deactivation threshold that may be based on the combination of the second torque and the first torque.

Some examples of the method, apparatus, and non-transitory computer-readable medium described herein may further include operations, features, means, or instructions for transitioning from the steering torque for the automated steering to the first torque for manual steering over a time duration based on a determination to deactivate the automated steering.

Some examples of the method, apparatus, and non-transitory computer-readable medium described herein may further include operations, features, means, or instructions for determining that the input torque may be less than the combination of the first torque and the second torque and transitioning from the input torque to the steering torque over a time duration in response to the determination that the input torque may be less than the combination of the first torque and the second torque, where the input torque may be less than the combination without a hand of an operator on the steering wheel.

Some examples of the method, apparatus, and non-transitory computer-readable medium described herein may further include operations, features, means, or instructions for adjusting, based at least in part on an input or driving variability associated with an operator, the first torque, the second torque, the mapping that varies with vehicle speed, a mapping that varies with a degree of steering, a third torque that is based at least in part on a mapping that varies with a degree of steering, the steering torque, or a combination thereof.

In some examples of the method, apparatus, and non-transitory computer-readable medium described herein, the combination further includes an interaction torque, and some examples of the method, apparatus, and non-transitory computer-readable medium described herein may further include operations, features, means, or instructions for increasing the interaction torque in response to a determination that a pinion angle rate may be greater than a rate threshold and that a driver interaction quantity may be less than an interaction threshold during the period in which the automated steering may be active.

In some examples of the method, apparatus, and non-transitory computer-readable medium described herein, the combination further includes an interaction torque that may be higher for steering towards a center of a lane than for steering away from the center of the lane during the period in which the automated steering may be active.

In some examples of the method, apparatus, and non-transitory computer-readable medium described herein, the combination further includes an interaction torque that may be increased during an automated evasive maneuver and during the period in which the automated steering may be active.

In some examples of the method, apparatus, and non-transitory computer-readable medium described herein, the combination further includes an interaction torque that may be higher for steering into a curve of a path on which the vehicle may be traveling than for steering out of the curve of the path.

Some examples of the method, apparatus, and non-transitory computer-readable medium described herein may further include operations, features, means, or instructions for comparing a current advanced driver assistance system (ADAS) level to a previous ADAS level and controlling the first torque, the second torque, or the steering torque based on a change in the current ADAS level from the previous ADAS level.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 5 shows an example of a block diagram that supports torques for application of automated steering of vehicles in accordance with one or more aspects of the present disclosure.

FIGS. 11 and 12 show flowcharts illustrating methods that support torques for application of automated steering of vehicles in accordance with one or more aspects of the present disclosure.

DETAILED DESCRIPTION

Figure 1:
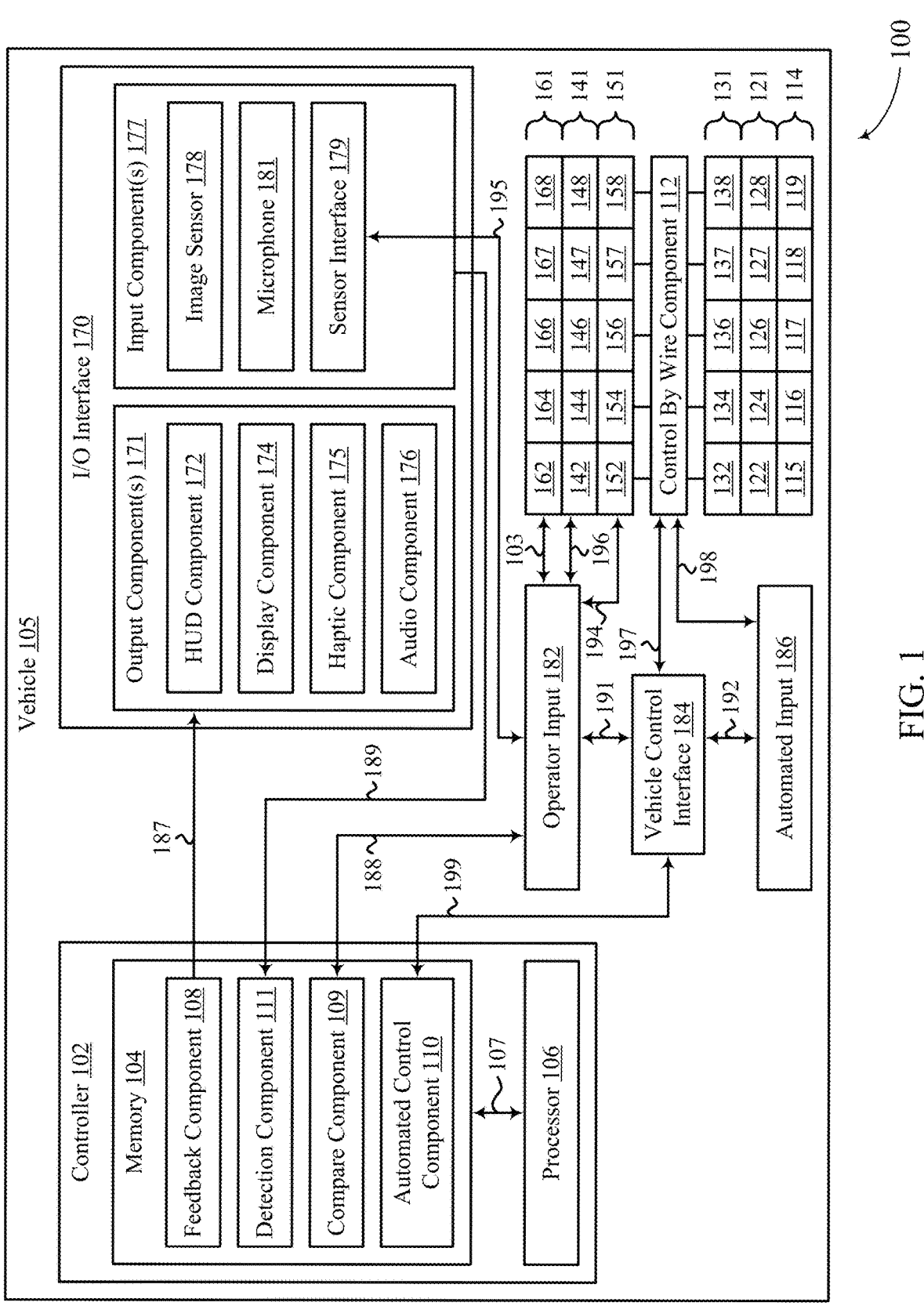
FIG. 1 shows an example of a block diagram illustrating an example of a vehicle that supports torques for application of automated steering of vehicles in accordance with one or more aspects of the present disclosure.

Some vehicles utilize an autonomous driving system or advanced driver assistance system (ADAS) to provide automated steering functionality. When active, an automated steering controller may control or assist in the lateral movement of the vehicle, where the feature may provide a torque on the steering wheel that a driver may sense when holding the steering wheel. When the driver wants to interact with the steering wheel during active automated driving, the steering wheel may feel stiff due to the automated driving control. The driver may work against the lateral control until a relatively high automated driving cancellation torque is reached, after which the automated driving may be deactivated. If the driver is actively steering, the steering wheel torque from the automated steering controller may be reduced to avoid the lateral control conflicting with the driver's steering. This may result in a relatively sudden change (e.g., reduction) in the steering wheel torque. The automated steering controller may detect when the driver stops actively steering, and may reactivate the automated driving control of the vehicle.

Some examples of the techniques described herein may include a feature where the torque of the steering wheel provides a seamless transition from automated driving to manual steering. For example, automated driving may remain active while the driver interacts with the steering wheel and may take control when the driver releases the steering wheel. The torque of the steering wheel may feel similar to the supportive torque of power steering, including an additional torque weight to indicate that automated driving is still active. Thus, a smooth transition between automated driving and manual driving may be provided.

In some approaches, an automated steering controller may impart a torque on a steering structure (e.g., steering wheel, steering column, another steering mechanism, or a combination thereof), where the torque is modeled as a combination of a characteristic power steering supportive torque and a second torque that may vary based on vehicle speed. The characteristic power steering supportive torque is a torque modeled to match (or to be similar to) a steering wheel torque with power steering (but without automated driving, for instance). The second torque may provide additional resistance to the characteristic power steering supportive torque to indicate to a driver that the automated driving is active. For example, the second torque may be modeled as a linear function or a non-linear function of speed. The second torque may be applied in addition to the characteristic power steering supportive torque (which may also vary based on speed). In some approaches, a third torque that may vary based on a curve tightness (e.g., degree of steering) may also be utilized. For example, the third torque may be modeled as a linear function or a non-linear function of curve tightness. The automated steering controller may impart a torque on the steering structure that is modeled as a combination of a characteristic power steering supportive torque, the second torque, and the third torque.

In some approaches, the second torque or the third torque may be adjusted (e.g., increased or decreased) based on an input (e.g., input from a button, voice recognition, or touch screen for example). In some approaches, the second torque or the third torque may be adapted based on external information (e.g., vehicle-to-everything (V2X) communication or cloud data). For instance, the automated steering controller may obtain information from an external sensor or from another vehicle indicating a road hazard. The second torque or the third torque may be adjusted to avoid an unintentional automated steering deactivation. In some approaches, the automated steering controller may be deactivated when a torque imparted by the driver exceeds the characteristic power steering supportive torque in combination with the second torque or the third torque. An additional controller may smoothly transition from the combination torque to the power steering supporting torque.

As used herein, the term "component" may refer to a part of a device or system, or may refer to electronic hardware (e.g., circuitry), a combination of hardware (e.g., a processor) and instructions, mechanical hardware, or any combination thereof. For example, a component may refer to instructions executed by a processor, a controller, circuitry, a field-programmable gate array (FPGA), an application-specific integrated circuit (ASIC), a computing device, a mechanical actuator, or a mechanical actuator controlled by an electronic controller or processor, among other examples. In some examples, one or more components may be localized to one processor or controller, or may be distributed between two or more processors or controllers. In some approaches, a component may include one or more computer readable media with one or more data structures or instructions stored thereon. In some examples, components may communicate electronically via wired or wireless signaling. For example, components may communicate via a wire, a bus, or a communication interface using one or more communication protocols (e.g., inter-integrated circuit (I2C), serial peripheral interface (SPI), universal serial bus (USB), Ethernet, Bluetooth, Institute of Electrical and Electronics Engineers (IEEE) 802.11 (e.g., "Wi-Fi"), cellular (e.g., 3G, 4G, long-term evolution (LTE), 5G, or 6G), or another protocol(s)).

As used herein, the term "vehicle" may refer to a machine for transportation that may be controlled by an operator, that may be autonomously controlled, or that may provide an operator with driving assistance (e.g., via an autonomous or semi-autonomous vehicle control system). For instance, a "vehicle" may refer to an automobile, a recreational vehicle, a boat, a ship, an airplane, or other vehicle.

As used herein, the term "operator" refers to an individual that may operate (e.g., control) a vehicle. An operator may be a driver of an automobile, a captain or pilot of a boat, a captain or pilot of an airplane, or other vehicle operator.

As used herein, the terms "automated vehicle control" or "autonomous vehicle control" refer to automated or autonomous vehicle control that may control one or more aspects (e.g., steering, braking, or acceleration, among other examples) of a vehicle without operator input.

Aspects of the disclosure are described in the context of block diagrams. Aspects of the disclosure are also described in the context of graphs. Aspects of the disclosure are further illustrated by and described with reference to apparatus diagrams, system diagrams, and flowcharts that relate to torques for application of automated steering of vehicles.

FIG. 1 shows an example of a block diagram 100 illustrating an example of a vehicle that supports torques for application of automated steering of vehicles in accordance with one or more aspects of the present disclosure. In some examples, the vehicle 105 may include an controller 102 and an input or output (I/O) interface 170. In some approaches, the controller 102 may include a processor 106 coupled with a memory 104 via a system bus 107. The processor 106 may be a general purpose processor or a special purpose processor configured to execute instructions stored in the memory 104. Additionally, or alternatively, the processor 106 may include on-board memory. In some examples, the processor 106 may include multiple processors that may perform one or more operations jointly or independently.

In some aspects, the memory 104 may store executable instructions. For instance, the memory 104 may include instructions for (e.g., to implement) an automated control component 110, a detection component 111, a compare component 109, or a feedback component 108. For instance, one or more of the automated control component 110, detection component 111, compare component 109, or feedback component 108 may be implemented with instructions executed by the processor 106. Additionally, or alternatively, one or more of the automated control component 110, detection component 111, compare component 109, or feedback component 108 may be implemented in hardware (e.g., circuitry, an FPGA, or an ASIC, among other examples), independently from the memory 104 or the processor 106. In some approaches, one or more of the automated control component 110, detection component 111, compare component 109, or feedback component 108 may perform one or more of the operations described herein.

In some approaches, the I/O interface 170 may include one or more an output components 171 configured to output information (to an operator of the vehicle 105, for instance). Additionally, or alternatively, the I/O interface 170 may include one or more input components 177 configured to obtain (e.g., receive) or provide input information to the controller 102. For example, the output component(s) 171 may include a heads up display (HUD) component 172, a display component 174, a haptic component 175, or an audio component 176. The HUD component 172 may be configured to display, project or otherwise output visual information (e.g., image(s) or video), which may be provided to an operator of the vehicle 105.

In some examples, the display component 174 may include one or more electronic elements (e.g., a liquid crystal display (LCD) panel, an organic light emitting display (OLED) panel, an e-ink panel, or a screen, among other examples) for providing (e.g., outputting) a visual signal (e.g., image(s), video, or other visual information). Additionally, or alternatively, the audio component 176 may include one or more electronic elements (e.g., one or more speakers or horns, among other examples) for providing (e.g., outputting) an audio signal (e.g., sounds, tones, a speech signal, or other audio information).

In some approaches, the input component(s) 177 may include one or more image sensors 178 (e.g., camera(s)), one or more microphones 181, or a sensor interface 179. In some examples, the image sensor(s) 178 may include one or more still or video cameras. The image sensor(s) 178 may capture light information (e.g., one or more images of a vehicle occupant(s), such as an operator of the vehicle 105) and may communicate the light information to the detection component 111. The microphone(s) 181 may capture acoustic information (e.g., sound signals or one or more sounds from a vehicle occupant(s), such as an operator of the vehicle 105) and may communicate the acoustic information to the detection component 111. In some approaches, the sensor interface 179 may be configured to receive information from one or more sensors of the vehicle 105 and communicate the state of the sensors to the detection component 111. For instance, the sensor interface 179 may receive information from one or more buttons, a touch screen, a safety belt sensor(s), door sensor(s), radio frequency (RF) sensor(s), accelerometer(s), motion sensor(s), or pressure sensor(s) (e.g., seat pressure sensor(s)), among other examples. In some aspects, the input component(s) 177 may provide input information 189 to the controller 102. The input information 189 may include information from the image sensor(s) 178, the microphone(s) 181, or the sensor interface 179.

The vehicle 105 may include vehicle systems 114 and vehicle controls 141. The vehicle systems 114 may include an accelerator 115, brake 116, steering 117, clutch 118, or one or more other systems 119. For instance, the accelerator 115 may include a powertrain of the vehicle 105 for pro-pulsion. The brake 116 may include the braking system of the vehicle for slowing or stopping the vehicle 105.

One or more sensors 121 may be associated with one or more of the vehicle systems 114. For example, a sensor 122 may be associated with the accelerator 115, a sensor 124 may be associated with the brake 116, a sensor 126 may be associated with the steering 117, a sensor 127 may be associated with the clutch 118, or a sensor 128 may be associated with the one or more other systems 119. One or more of the sensors 121 may be configured to detect or communicate a state of a respective vehicle system to a control by wire component 112 (e.g., a "drive by wire" system for an automobile). The control by wire component 112 may receive electronic control inputs from one or more vehicle controls. In some examples, the control by wire component 112 may provide one or more signals to operate one or more of the vehicle systems 114 via one or more actuators 131. For example, an actuator 132 may be associated with the sensor 122 or the accelerator 115. In some approaches, the actuator 132 may receive a control signal from the control by wire component 112 and may provide a signal that causes the accelerator 115 to control the speed of the vehicle 105. The sensor 122 may monitor the vehicle system (e.g., the accelerator 115) or the actuator 132, and may provide information to the sensor interface 179.

In some examples, an actuator 134 may be associated with the sensor 124 or the brake 116. In some aspects, the actuator 134 may receive a control signal from the control by wire component 112, and may provide a signal that causes the brake 116 to engage or disengage (e.g., to slow the vehicle 105 or allow the vehicle 105 to move). The sensor 124 may monitor the vehicle system (e.g., the brake 116) or the actuator 134, and may provide information to the sensor interface 179.

In some aspects, an actuator 136 may be associated with the sensor 126 or the steering 117. In some examples, the actuator 136 may receive a control signal from the control by wire component 112 and may provide a signal that causes the steering 117 to control the direction (e.g., lateral direction) of the vehicle 105. The sensor 126 may monitor the vehicle system (e.g., the steering 117) or the actuator 136, and may provide information to the sensor interface 179. In some examples, the actuator 136 or the actuator 166 may be coupled to, or associated with, a steering structure 146 (e.g., a steering wheel, steering column, another steering mechanism, or a combination thereof). The actuator 136 or the actuator 166 may apply (e.g., impart) a torque on the steering structure 146. The torque applied to the steering structure 146 may be associated with an amount of steering 117 performed.

In some approaches, an actuator 137 may be associated with the sensor 127 or the clutch 118. In some examples, the actuator 137 may receive a control signal from the control by wire component 112 and may provide a signal that causes the clutch 118 to engage or disengage drive power to the vehicle 105. The sensor 127 may monitor the vehicle system (e.g., the clutch 118) or the actuator 137, and may provide information to the sensor interface 179. In some examples, an actuator 138 may be associated with one or more other sensors 128 or one or more other systems 119.

The vehicle controls 141 may be coupled with the control by wire component 112 or the sensors 151. The vehicle controls 141 may be control systems that receive control inputs from an operator. For instance, the accelerator 142 may include an accelerator pedal of the vehicle 105 that is configured to be operated by an operator's foot.

In some examples, the brake control 144 may include a brake pedal of the vehicle 105 that is configured to be operated by an operator's foot. Additionally, or alternatively, the steering structure 146 may be a steering wheel of the vehicle 105 that is configured to be operated by an operator's hands; the clutch control 147 may include a clutch pedal of the vehicle 105 that is configured to be operated by an operator's foot; or one or more other controls 148 may include one or more other vehicle controls.

A sensor 152 may be associated with the accelerator 142, a sensor 154 may be associated with the brake control 144, a sensor 156 may be associated with the steering structure 146, a sensor 157 may be associated with the clutch control 147, or one or more sensors 158 may be associated with one or more other controls 148. The sensors 151 may provide a respective control input to the control by wire component to translate the operator-provided vehicle controls to the actual vehicle systems 114.

One or more actuators 161 may be associated with one or more respective vehicle controls 141. An actuator 162 may be associated with the accelerator 142, an actuator 164 may be associated with the brake control 144, an actuator 166 may be associated with the steering structure 146, an actuator 167 may be associated with a clutch control 147, or one or more other actuators 168 may be associated with one or more other controls 148. The actuators 161 may be utilized to actuate one or more of the vehicle controls 141. For instance, one or more of the actuators 161 may provide mechanical feedback or tuning to one or more of the vehicle controls 141, which may control the stiffness or softness of the vehicle control(s) 141. For instance, the actuator 166 may impart a torque to the steering structure 146, which may affect a quantity of force (e.g., stiffness or softness) of the steering structure 146 for steering the vehicle 105. In some approaches, the actuator(s) 161 may be coupled with the operator input component 182 (e.g., via connection 103). For instance, the actuator(s) 161 may be controlled by the operator input component 182 (or by the vehicle control interface 184, the automated input component 186, the automated control component 110, or the compare component 109 via the operator input component 182).

In some examples, the vehicle 105 may include one or more mechanisms for controlling the vehicle 105 in addition to, or alternatively from, the control by wire component 112. For instance, the steering structure 146 may be mechanically coupled (via a steering column, for instance) with a rack and pinion mechanism for steering the vehicle 105. The actuator 136 may operate in conjunction with the steering column, steering wheel, or rack and pinion mechanism to steer the vehicle 105 when automated steering is active. In some examples, one or more actuators 131 may additionally, or alternatively, operate with one or more mechanisms in addition to, or alternatively from, the control by wire component 112. In some examples, the vehicle 105 may not include a control by wire component 112, and may utilize direct mechanical couplings to control one or more of the vehicle systems 114.

The vehicle 105 may include an operator input component 182, a vehicle control interface 184, or an automated input component 186. In some aspects, the operator input component 182 may represent one or more manual operator inputs provided to the vehicle 105 when the vehicle is under manual operator control, or when the vehicle may be under autonomous control and manual operator inputs are being compared with the autonomous control inputs to determine whether to transition to or from an autonomous driving state (e.g., automated steering). The operator input component

182 may be coupled with the vehicle controls 141 (e.g., via a connection 196), may be coupled with the sensor(s) 151 (e.g., via a connection 194), or may be coupled with the compare component 109 (e.g., via a connection 188). In some examples, the sensor(s) 151 may receive one or more respective inputs from the operator input component 182 or may provide an output to the sensor interface 179.

The vehicle control interface 184 may be coupled with the control by wire component 112 (e.g., via connection 197), may be coupled with the operator input component 182 (e.g., via connection 191), or may be coupled with the automated input component 186 (e.g., via connection 192). The vehicle control interface 184 may be operatively coupled with the automated control component 110 (e.g., via connection 199).

When the vehicle 105 may be operating in an automated mode (e.g., when automated steering is active), the automated control component 110 may control the vehicle 105 by sending control signaling to the vehicle control interface 184. The vehicle control interface 184 may provide control signaling to the control by wire component 112. The control by wire component 112 may provide one or more inputs to the vehicle system(s) 114, to the actuator(s) 131, or to the sensor(s) 121 to operate the vehicle 105. The automated input component 186 may monitor the control by wire component 112 (e.g., via connection 198), or may provide information regarding vehicle operations or performance (e.g., via connection 192) to the vehicle control interface 184. The vehicle control interface 184 may provide corresponding information (e.g., via connection 199) to the automated control component 110, which may provide corresponding information to the compare component 109.

In some examples of the techniques described herein, the vehicle 105 or one or more components may transition from an automated mode (e.g., automated steering) to a manual mode (e.g., manual steering). For example, when the vehicle 105 is operating in automated mode, the automated control component 110 may continue to control the vehicle 105. As an operator begins engaging the vehicle controls 141 (e.g., the steering structure 146), the sensors 151 may begin sensing and providing the manual inputs to the control by wire component 112 or to the operator input component 182 (e.g., via connection 194). In some examples, the operator input component 182 may provide (e.g., signal) one or more of the manual inputs to the sensor interface 179 (e.g., via connection 195).

The detection component 111 may receive information from the input component(s) 177 indicating the manual inputs provided by the operator. The detection component 111 may provide information indicating the manual inputs to the compare component 109. The compare component 109 may receive the automated inputs used to autonomously operate the vehicle 105 by an autonomous vehicle control system, and may receive information indicating the manual inputs provided to the vehicle 105 by the manual operator. Initially, the manual inputs provided to the vehicle 105 by the manual operator may not actually control the vehicle 105, or may be provided to the compare component 109 for comparison with the autonomous vehicle control inputs.

The compare component 109 may determine whether the manual input provided by the manual operator is similar to, or differs (to a threshold extent, for example) from the automated input provided to the vehicle 105. For instance, the compare component 109 may determine whether to deactivate automated control (e.g., automated steering) by comparing a manual input (e.g., steering input torque) to an automated control deactivation threshold (e.g., automated steering deactivation threshold). For instance, if the manual input satisfies the automated control deactivation threshold, the automated control component 110 may deactivate automated control of the vehicle 105 or the vehicle 105 may be controlled in accordance with the manual input.

In some examples, the compare component 109 may provide information to the feedback component 108 indicating whether or not the automated control deactivation threshold is satisfied. For instance, if the manual input satisfies the automated control deactivation threshold, the feedback component 108 may provide information to the output component(s) 171 (e.g., via connection 187) indicating that automated control (e.g., automated steering) is deactivated. One or more of the output components 171 may output an indication (e.g., image, sound, speech signal, or haptic signal, among other examples) that the automated control is deactivated.

In some approaches, logic (e.g., "driver in the loop logic") may be utilized when a driver interacts with a steering structure of a vehicle that is performing automated steering. A principle of the logic may be based on applying torque limits to a steering torque request in a steering electronic control unit (ECU). When a measured steering structure torque (e.g., input torque) exceeds a threshold, driver interaction is detected. The threshold may be set sufficiently high to avoid detecting driver interaction when the driver has hands on the steering wheel. This automated steering may provide ADAS level 2, which may include partial automation where some driving operations (e.g., braking, steering, or accelerating, among other examples) may be automated, but the driver may take control of the vehicle.

Some examples of the logic may close one or more torque limits when a driver is detected as interacting with the vehicle. When the driver is not interacting with the steering wheel, for example, an upper torque limit and a lower torque limit have initial values that are large enough to avoid limiting the torque provided by the automated steering feature. When the driver is detected as interacting, the torque limits may be tightened (e.g., the upper torque limit may be reduced or ramped down and the lower torque limit may be increased or ramped up) from the initial values with a rate towards tightened values (e.g., values that are nearer to each other). For instance, the torque limits may ramp from initial higher and lower torque limits to closer values. If the ramping is too steep, an uncomfortable jerk in the steering wheel may occur. While the torque limits are closed (e.g., tighter), the lower torque limit may limit the torque provided by the automated steering feature (e.g., the torque imparted to the steering wheel by the automated steering feature). In some cases, an asymmetry of the upper and lower torque limits may occur relative to 0 torque. The asymmetry may occur due to steering curvature or a single-sided lane keep assist (LKA) intervention.

The torque limits may be applied to the automated steering torque feature request in the steering ECU. By limiting the automated steering feature torque request, the driver may smoothly take control of steering without significantly opposing the automated steering feature. When the driver stops interacting with the steering wheel, the automated steering feature torque request may be ramped in again by spreading or opening the torque limits (e.g., increasing a difference between the upper torque limit and the lower torque limit). For instance, the torque limits may open again (e.g., spread), which may allow the automated steering feature torque to ramp in. If the ramping in of the automated steering feature is too steep, an uncomfortable jerk in the steering wheel may occur. The behavior of the ramping torque limits may be tunable or may have different tuning for different modes. Some challenges with some of these approaches may include a dependency on a steering ECU supplier to add torque limits in an interface (to allow control of the torque limits) or a delay in closing or opening the torque limits.

Some examples of the techniques described herein may provide enhanced feedback for automated steering or may enable smooth transitions between automated steering and manual steering. In some approaches, the controller 102 (e.g., the automated control component 110, the compare component 109, or the detection component 111, among other examples) or the vehicle 105 may perform one or more techniques described with reference to FIG. 3. For instance, automated control component 110 (e.g., an automated steering controller) may control the actuator 166 (e.g., via the vehicle control interface 184 or via the operator input component 182, for instance) to impart a torque on the steering structure (e.g., steering wheel, steering column, another steering mechanism, or a combination thereof) that is modeled as a combination of a characteristic power steering supportive torque and a first torque that may vary based on vehicle 105 speed. The characteristic power steering supportive torque may be a torque modeled to match (or to be similar to) a steering structure 146 (e.g., steering wheel) torque with power steering (but without automated driving, for instance). The first torque may provide additional resistance to the characteristic power steering supportive torque to indicate to an operator (e.g., driver) that the automated driving is active. For example, the first torque may be modeled as a linear function or a non-linear function of speed. The first torque may be applied in addition to the characteristic power steering supportive torque (which may also vary based on speed). In some approaches, a second torque that may vary based on a curve tightness (e.g., degree of steering) may also be utilized. For example, the second torque may be modeled as a linear function or a non-linear function of curve tightness. The automated control component 110 (e.g., automated steering controller) may impart a torque on the steering structure 146, where the torque is modeled as a combination of a characteristic power steering supportive torque, the first torque, and the second torque.

In some approaches, the first torque or the second torque may be adjusted (e.g., increased or decreased) based on an input (e.g., input from a button, voice recognition, or touch screen for example). In some approaches, the first torque or the second torque may be adapted based on external information (e.g., V2X communication or cloud data). For instance, the controller 102 (e.g., automated control component 110 or automated steering controller) may obtain information via a communication interface from an external sensor or from another vehicle indicating a road hazard. The first torque or the second torque may be adjusted to avoid an unintentional automated steering deactivation. In some approaches, the controller 102 (e.g., compare component 109 or automated control component 110) may deactivate automated steering when a torque imparted by the operator exceeds the characteristic power steering supportive torque in combination with the first torque or the second torque. An additional controller may smoothly transition from the combination torque to the power steering supporting torque.

Figure 2:
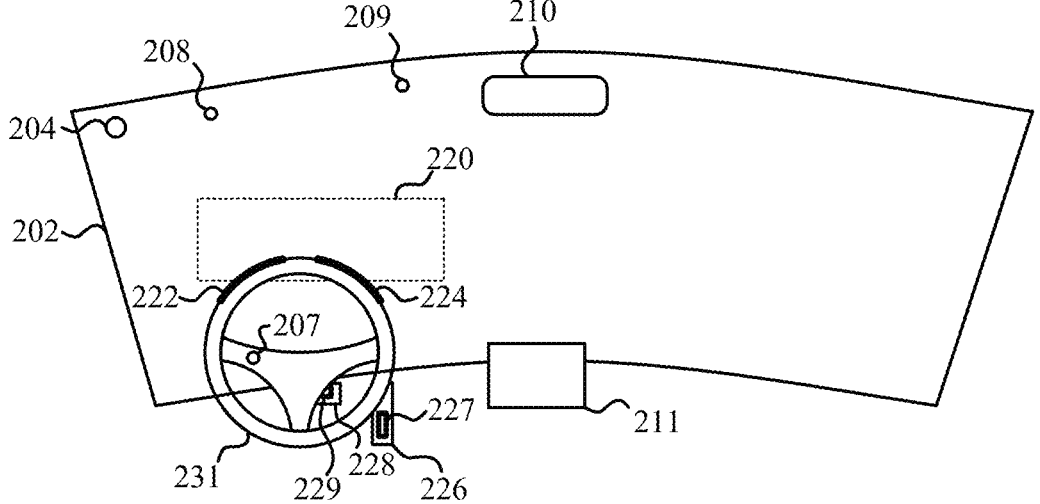
FIG. 2 shows examples of elements of a vehicle that support torques for application of automated steering of vehicles in accordance with one or more aspects of the present disclosure.

FIG. 2 shows examples of elements 200 of a vehicle that supports torques for application of automated steering of vehicles in accordance with one or more aspects of the present disclosure. For instance, one or more of the elements 200 may be included in a vehicle (e.g., the vehicle 105 described with reference to FIG. 1). One or more of the elements 200 may include a camera 204, a microphone 207, a light 208, a speaker 209, an HUD 220, or a touchscreen display 211. In some approaches, the camera 204, microphone 207, light 208, speaker 209, HUD 220, and the touchscreen display 211 are illustrated relative to a vehicle windshield 202. A rear-view mirror 210 (or display, for instance), is also illustrated. A steering wheel 231 may include sensors 222 and 224 to sense contact (e.g., the position of contact) with the steering wheel 231 of an operator's hand(s). An accelerator pedal 226 may include a sensor 227 to sense pressure (or position, for instance) of an operator's foot on the accelerator pedal 226. A brake pedal 228 may include a sensor 229 to sense pressure (or position, for instance) of the operator's foot on the brake pedal 228.

More or fewer of the elements 200 shown in FIG. 2 or one or more other elements may be implemented. One or more of the elements 200 described with reference to FIG. 2 may be examples of one or more corresponding elements described with reference to FIG. 1. For instance, the steering wheel 231 may be an example of the steering structure 146 described with reference to FIG. 1. Additionally, or alternatively, one or more of the camera 204, microphone 207, light 208, speaker 209, HUD 220, or touchscreen display 211 may be examples of corresponding elements described with reference to FIG. 1.

Figure 3:
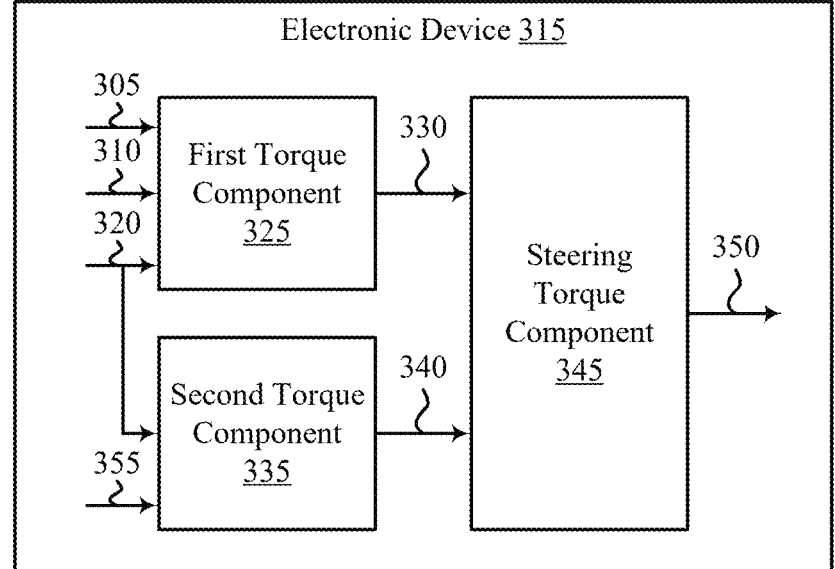
FIG. 3 shows an example of a block diagram that supports torques for application of automated steering of vehicles in accordance with one or more aspects of the present disclosure.

FIG. 3 shows an example of a block diagram 300 that supports torques for application of automated steering of vehicles in accordance with one or more aspects of the present disclosure. In particular, FIG. 3 illustrates an example of an electronic device 315. The electronic device may be implemented in hardware (e.g., circuitry) or in a combination of hardware and instructions (e.g., a processor with instructions). The electronic device 315 may be an example of one or more elements or components described with reference to FIG. 3. For instance, the electronic device 315 may be an example of the controller 102, or the controller 102 may be example of the electronic device 315. In some approaches, the electronic device 315 may be an example of the vehicle 105, may be included in the vehicle 105, or may be coupled with the vehicle 105. In some aspects, the electronic device 315 may be an ECU or may include an ECU.

The electronic device 315 may include a first torque component 325, a second torque component 335, or a steering torque component 345. One or more components of the electronic device 315 may be implemented in hardware (e.g., circuitry) or in a combination of hardware and instructions (e.g., a processor with instructions).

The electronic device 315 (e.g., the first torque component 325) may determine a first torque 330 from characteristic power steering data 305 based on an input torque 310 to a steering wheel of a vehicle and a speed 320 of the vehicle. For example, the characteristic power steering data 305 may be data that maps an input torque 310 (e.g., an indication or value of an input torque) and a vehicle speed 320 (e.g., an indication or value of vehicle speed) to a torque (e.g., the first torque 330). For instance, the first torque component 325 may provide a torque value (e.g., the first torque 330) at the input torque 310 (e.g., torque input to the steering wheel by an operator) on a curve or line of the characteristic power steering data 305 corresponding to the speed 320 of the vehicle. In some examples, the characteristic power steering data 305 may be expressed as a lookup table, function, indexed array, tree, or other data structure. The characteristic power steering data 305 may be stored in memory (e.g., memory included in the electronic device 315 or in electronic communication with the electronic device 315).

The characteristic power steering data 305 may indicate a range of torques (e.g., feedback torque) on a steering structure when a vehicle is driven with a range of speeds and with a range of input torque (e.g., an amount of torque exerted on the steering structure by an operator). For instance, power steering may be active when an operator manually steers a vehicle (e.g., without active automated steering). Examples of power steering may include hydraulic power steering where hydraulic fluid is utilized to ease steering (e.g., reduce input torque for steering the wheels) of a vehicle and electric power steering where an electric motor is utilized to ease steering of a vehicle. For instance, power steering may provide relatively easier low speed steering or an improved sense of the road for an operator. Without power steering, more torque (e.g., effort) may be utilized to steer a vehicle (e.g., when the vehicle was in a standstill). The characteristic power steering data 305 may indicate an amount of feedback torque (e.g., a supportive torque or feedback torque on a steering structure that an operator may experience while utilizing power steering) resulting from power steering a vehicle. Depending on the torque input to the steering wheel and the speed of the vehicle, the feedback torque or supportive torque may amplify the torque input to the steering wheel. Without active automated steering (e.g., automated driving), an operator may manually steer a vehicle utilizing power steering, which may simplify steering (e.g., reduce a quantity of rotations of the steering wheel to steer the wheels) or amplify steering wheel input torque. An example of the characteristic power steering data 305 is provided with reference to FIG. 4. The characteristic power steering data 305 may vary for different vehicles or different vehicle weights.

In some examples, the input torque 310 may be sensed by, or determined based on measurements by, a sensor (e.g., the sensor 156 associated with the steering structure 146). For instance, the sensor may sense an amount of torque imparted to a steering structure (e.g., steering wheel or steering column) imparted by an operator, if any.

In some examples, the vehicle speed 320 may be sensed by, or determined based on measurements by, a sensor (e.g., a speedometer of the vehicle 105, the sensor 152 associated with the accelerator 142, a motion sensor, an accelerometer, or any combination thereof, among other examples). For instance, the sensor may sense a traveling speed or velocity of a vehicle to generate an indication (e.g., measurement) of vehicle speed 320. The first torque component 325 may determine (e.g., select) the first torque 330 of the characteristic power steering data 305 corresponding to the input torque 310 and the vehicle speed 320.

The electronic device 315 (e.g., second torque component 335) may determine a second torque 340 based on a mapping 355 that varies with vehicle speed 320. For example, the mapping 355 may be data that maps a vehicle speed 320 (e.g., an indication or value of vehicle speed) to a torque (e.g., the second torque 340). For instance, the second torque component 335 may provide a torque value (e.g., the second torque 340) of the mapping 355 corresponding to the speed 320 of the vehicle. In some examples, the mapping 355 may be expressed as a lookup table, function, indexed array, tree, or other data structure. In some aspects, the mapping 355 may correspond to a function (e.g., a line, a curve, or a non-linear function, among other examples). The mapping 355 (e.g., function) may increase (e.g., may be monotonically increasing) with increasing vehicle speed 320, in some examples. The mapping 355 may be stored in memory (e.g., memory included in the electronic device 315 or in electronic communication with the electronic device 315).

The mapping 355 may indicate a range of torques for a range of speeds of a vehicle. The mapping 355 may indicate an amount of additional torque (e.g., second torque 340) indicating that automated steering is active. For instance, the second torque 340 may provide additional feedback stiffness for a steering wheel to indicate to an operator that automated steering. An example of the mapping 355 is provided with reference to FIG. 4. The mapping 355 may vary for different vehicles or different vehicle weights. The second torque component 335 may determine (e.g., select) the second torque 340 of the mapping 355 corresponding to the vehicle speed 320.

The electronic device 315 (e.g., steering torque component 345) may determine a steering torque 350 based on a combination of the first torque 330 from the characteristic power steering data 305 and the second torque 340. For instance, the steering torque component 345 may sum, add, subtract, multiply, divide, or otherwise combine the first torque 330 and the second torque 340 to generate (e.g., calculate or compute) the steering torque 350.

The steering torque 350 may be applied to the steering structure of the vehicle during a period in which automated steering is active. The steering torque that is based on the second torque 340 may indicate that the automated steering is active. For instance, the second torque 340 (or the third torque) in combination with the first torque 330 may provide a different stiffness from the first torque 330 alone, which may indicate to an operator that automated steering is active. In some approaches, the electronic device 315 may output the steering torque 350 to an actuator (e.g., the actuator 166 or other actuator described with reference to FIG. 1) to apply the steering torque 350 to the steering structure (e.g., steering wheel, steering column, another steering mechanism, or a combination thereof). In some aspects, the steering torque 350 may be expressed as a signal (e.g., an electrical or electronic signal) to cause an actuator (e.g., electric motor or hydraulic pump) to exert the steering torque 350 on the steering wheel. The actuator may impart a mechanical force (e.g., mechanical resistance), electrical force, electro-mechanical force (e.g., electromagnetic force, electronically controlled mechanical or magnetic resistance force, or electronic torque motor force, among other examples), hydraulic force, or other force to the steering structure to apply the steering torque 350 to the steering structure. In some examples, the actuator may be a torque motor.

The electronic device 315 (e.g., a third torque component) may determine a third torque based on a mapping that varies with a degree of steering. For example, the mapping may be data that maps a degree of steering (e.g., an indication or value of steering) to a torque (e.g., the third torque). For instance, the third torque component may provide a torque value (e.g., the third torque) of the mapping corresponding to the degree of steering of the vehicle. In some examples, the mapping may be expressed as a lookup table, function, indexed array, tree, or other data structure. In some aspects, the mapping may correspond to a function (e.g., a line, a curve, or a non-linear function, among other examples). The mapping (e.g., function) may increase (e.g., may be monotonically increasing) with an increasing degree of steering, in some examples. The mapping may be stored in memory (e.g., memory included in the electronic device 315 or in electronic communication with the electronic device 315).

The mapping may indicate a range of torques for a range of steering of a vehicle. The mapping may indicate an amount of additional torque (e.g., third torque) indicating that automated steering is active. For instance, the third torque may provide additional feedback stiffness for a steering wheel to indicate to an operator that automated steering is active. An example of the mapping (for the degree of steering) is provided with reference to FIG. 4. The mapping may vary for different vehicles or different vehicle weights. The third torque component may determine (e.g., select) the third torque of the mapping corresponding to the degree of steering.

In some examples, a degree of steering may be sensed by, or determined based on measurements by, a sensor (e.g., the sensor 156 or the sensor 126 of the vehicle 105 or another sensor, among other examples). For instance, the sensor may sense the steering of a vehicle to generate an indication (e.g., measurement) of the degree of steering (e.g., curvature). The third torque component may determine (e.g., select) the third torque of the mapping corresponding to the degree of steering.

In some aspects, the combination for determining the steering torque 350 may include the third torque. For example, the electronic device 315 (e.g., steering torque component 345) may determine the steering torque 350 based on a combination of the first torque 330 from the characteristic power steering data 305, the second torque 340, and the third torque. For instance, the steering torque component 345 may sum, add, subtract, multiply, divide, or otherwise combine the first torque 330, the second torque 340, and the third torque to generate (e.g., calculate or compute) the steering torque 350.

In some approaches, the steering torque component 345 may jointly determine the steering torque 350. For instance, the characteristic power steering data 305, the mapping 355 (for the vehicle speed 320), or the mapping (for the degree of steering) may be combined into one data set, from which the steering torque 350 may be determined based on the input torque 310, the vehicle speed 320, and the degree of steering.

In some examples of the techniques described herein, the steering torque 350 (e.g., a torque exerted on a steering structure) and a speed-dependent supportive torque for automated steering (e.g., including a torque weight) may be utilized to interact with (e.g., provide feedback to) an operator of the vehicle. For instance, when automated steering (e.g., automated driving) is active, the automated steering may be in control of steering the vehicle while the driver is allowed to steer freely. The steering torque 350 may provide a feedback torque similar to power steering but with an extra torque weight to indicate that automated steering (e.g., automated driving) is active, which may enable the operator to know that automated steering (e.g., automated driving) is active. Accordingly, an operator may have control of the vehicle with a feeling that automated steering (e.g., automated driving) is active.

In some examples, an automated steering deactivation threshold may be based on the steering torque 350. For instance, the steering torque 350 may be the automated steering deactivation threshold or may be utilized to determine (e.g., calculate or compute) the automated steering deactivation threshold (e.g., with a scaling factor or an offset, among other examples). In some approaches, if the input torque 310 satisfies (e.g., reaches or passes) the automated steering deactivation threshold, the automated steering (e.g., automated driving) may be deactivated. When automated steering (e.g., automated driving) is inactive, the vehicle may provide power steering support (e.g., power steering torque without the additional second torque 340 or third torque). In some approaches, a deactivation torque may be greater than (e.g., significantly greater than) a torque provided by an ADAS. In those approaches, an operator may provide significantly more torque (than the torque provided by the ADAS, for instance) to deactivate autonomous steering. Due to a relatively large difference between the deactivation torque and manual steering torque, a relatively sudden reduction in torque after deactivation may cause the steering wheel to feel loose or to jerk. Some of the techniques described herein may utilize the automated steering deactivation threshold based on the steering torque 350 or a transition (e.g., ramping between the steering torque 350 and a first torque 310) to provide a smoother (e.g., less steep, more natural, or personalized) transition from automated steering (e.g., ADAS steering) to manual steering.

In some examples, the behavior of the speed-dependent mapping 355 for the second torque 340 or the steering-dependent (e.g., curve dependent) mapping for the third torque (e.g., driver interaction torque weight) may be tuned offline (e.g., during development and tuning with vehicle testing). In some approaches, the behavior of the speed-dependent mapping 355 for the second torque 340 or the steering-dependent (e.g., curve dependent) mapping for the third torque (e.g., driver interaction torque weight) may be tuned or calibrated online (e.g., during runtime or after development). For instance, on-demand turning may be performed, where the characteristic power steering data 305, the mapping 355 corresponding to vehicle speed 320, or the mapping corresponding to a degree of steering may be adapted dynamically (e.g., during use).

In some examples, the electronic device 315 (or a vehicle, for instance) may obtain an input via an input device for adjusting the mapping that varies with vehicle speed 320, the mapping that varies with the degree of steering, or the combination for determining the steering torque 350. For instance, the electronic device 315 may obtain an input via one or more of the input components 177 described with reference to FIG. 1. The electronic device 315 (or a vehicle, for instance), may adjust the mapping 355 that varies with vehicle speed 320, the mapping that varies with the degree of steering, or the combination based on the input.

In some approaches, the input may be a speech signal. For example, the electronic device 315 may obtain a speech signal via the microphone 181 described with reference to FIG. 1. The electronic device 315 (or a vehicle, for instance) may execute an artificial intelligence or machine learning (AI/ML) model based on the speech signal to determine an adjustment to the mapping that varies with vehicle speed 320, to the mapping that varies with the degree of steering, or to the combination.

In an example of tuning on demand, an operator may desire a different additional torque (e.g., a different second torque 340, third torque, or driver interaction torque weight). The operator may request the change for a stiffer or softer torque via a human-machine interface (HMI) or via a voice command (e.g., the I/O interface 170). In some examples, an AI/ML model (e.g., a large language model (LLM) or other AI/ML model) may be utilized to translate the voice command to the requested setting. Utilizing an AI/ML model may alleviate a demand for specific key words. In a scenario, an operator may consider the additional torque as too stiff. Over a voice command, the operator may requests a softer weight, which may be interpreted by an LLM. As a result, the electronic device 315 (or a vehicle) may adjust the speed-dependent torque (e.g., speed-dependent mapping 355) or the curvature-dependent torque (e.g., curvature-dependent mapping) to a lower (e.g., softer) setting. In an example of on-line tuning change, the electronic device 315 may scale down or reduce a slope of the mapping 355, which may reduce the second torque 340 and the stiffness of the steering torque 350. An example of a voice command may be: "My car, put a softer steering weight in the curve I was just in," which may result in an adjustment to the curvature-dependent mapping or third torque. Another example of a voice command may be: "My car, I want to have it more difficult to take over steering when I am driving fast," which may result in an adjustment to the speed-dependent mapping 355 or second torque 340.

In some examples, the electronic device 315 (or a vehicle) may obtain information from a device that is external to the vehicle. For instance, the electronic device 315 may receive information from a network (e.g., cloud), from a vehicle, from a sensor, or from a wireless device, among other examples. The electronic device 315 (or a vehicle) may adjust the second torque 340, the third torque, or the steering torque 350 based on the information. For instance, online speed or curve adaptation may be performed based on the information. Static tuning may be adapted for a driving situation based on external information (e.g., vehicle-to-everything (V2X) communication, cloud communication, or sensor data, among other examples). The characteristic power steering data 305, the mapping 355 (depending on vehicle speed 320), or the mapping (depending on degree of steering) (e.g., characteristic diagrams) may be automatically adapted based on the information (e.g., driving situation). In some examples, the electronic device 315 (e.g., a vehicle) may adjust the steering torque 350 (or one or more components thereof) based on geographic map information obtained from a network (e.g., mapping server). For instance, the electronic device 315 may predictively adjust, tune, learn, or calibrate the steering torque 350 based on an upcoming path (e.g., curve, hill, traffic, stoplight, or freeway exit, among other examples).

In some examples, the characteristic power steering data 305, the mapping 355 (that varies based on vehicle speed), or the mapping (that varies based on a degree of steering) may be obtained (e.g., requested and received) from an external device (e.g., from a server, network storage, a vehicle, or other device). For instance, the characteristic power steering data 305, the mapping 355 (that varies based on vehicle speed), or the mapping (that varies based on a degree of steering) may be associated with a vehicle make and model or other attributes (e.g., power train type, steering system type, among other examples). The electronic device 315 may send a request to the external device with information indicating one or more attributes (e.g., make, model, and year, among other examples) of the vehicle, which may enable selection or communication of the characteristic power steering data 305, the mapping 355 (that varies based on vehicle speed), or the mapping (that varies based on a degree of steering). In some approaches, the characteristic power steering data 305 may be obtained from an original equipment manufacturer (OEM), which may provide the characteristic power steering data via a network (e.g., via a server and a network connection). Additionally, or alternatively, the characteristic power steering data 305 may be obtained via crowdsourcing (e.g., from one or more submissions from one or more devices, such as from another vehicle with a same make and model). In some approaches, a server may store crowdsourced characteristic power steering data for one or more vehicles, which may be retrieved by the electronic device 315. In some examples, the characteristic power steering data 305 may be determined by the electronic device 315 (or a vehicle). For instance, the electronic device 315 may measure steering structure torque at different speeds and input torques 310 while the vehicle is being driven manually to generate the characteristic power steering data 305. For instance, the electronic device 315 may detect (e.g., sense) the characteristic power steering data 305 while the vehicle is being manually steered over a distance (e.g., a few kilometers) or with a threshold quantity of samples. In some approaches, the electronic device 315 may store default characteristic power steering data 305, which may be adjusted based on data (e.g., sensor data, steering column data, or steering wheel torque data, among other examples) detected or sampled while driving. In some aspects, the characteristic power steering data 305 may be sent (e.g., transmitted) to one or more other vehicles (e.g., with one or more similar attributes) for use in automated steering control or may be sent to a crowdsourcing server for later access by the electronic device 315 (or another device or vehicle, for instance).

In some examples, the characteristic power steering data 305, the mapping 355 (that varies based on vehicle speed), or the mapping (that varies based on a degree of steering) may be associated with one or more operator profiles. For instance, the characteristic power steering data 305, the mapping 355 (that varies based on vehicle speed), or the mapping (that varies based on a degree of steering) may be tuned (e.g., customized) or stored for one or more operators. In some approaches, operator recognition may be utilized to set the characteristic power steering data 305, the mapping 355 (that varies based on vehicle speed), or the mapping (that varies based on a degree of steering) based on a recognized operator. In some aspects, the characteristic power steering data 305, the mapping 355 (that varies based on vehicle speed), or the mapping (that varies based on a degree of steering) may be communicated or remotely stored for application in one or more vehicles that an operator may drive. For instance, an operator may utilize another vehicle, which may obtain (e.g., download) the characteristic power steering data 305 corresponding to the operator profile of the operator. In some examples, one or more other profiles may be utilized (e.g., profiles with increased or reduced supportive torque for different operator experiences). In some examples, different profiles may be utilized or allowed based on vehicle capabilities or vehicle make/model. In some examples, a profile may provide a mapping 355 (that varies based on vehicle speed) or a mapping (that varies based on a degree of steering), which may enable personalizing a transition from the steering torque 350 (for the automated steering, for instance) to the first torque 330 (for manual steering, for instance) over a time duration for an operator.

In some approaches (e.g., with or without a profile), the characteristic power steering data 305, the mapping 355 (that varies based on vehicle speed), the mapping (that varies based on a degree of steering), the first torque 330, the second torque 340, a third torque, or the steering torque 350 may be adjusted, tuned (e.g., customized), or stored for one or more operators by the electronic device 315. For instance, the steering torque 350 may be adjusted based on an operator's preference, input, or driving variability. A driving variability may indicate, or may be a measure of, a driving pattern (e.g., steering, input torque, or another input(s)) associated with an operator. The driving variability may be expressed as a statistical measure (e.g., of the input torque 310 or another input(s)) or may vary in relation to a default or average operator driving behavior. Some operators may tend to exert more or less force or input torque 310. One or more of the torques, thresholds (e.g., steering deactivation threshold), or other factors described herein may be adjusted based on an operator's preference, input, or variability in driving. For instance, an operator may, based on preference, provide an input to the electronic device 315 to adjust one or more of the torques, thresholds, or other factors described herein. Additionally, or alternatively, the electronic device 315 may sample the input torque 310 (in association with an operator or operator profile, for instance), which may be utilized to determine an operator's tendency to impart input torque 310. If the sampled input torque 310 (e.g., average input torque over a period) satisfies one or more conditions (e.g., threshold(s)), the electronic device 315 may adjust one or more of the torques, thresholds, or other factors described herein. For instance, if an operator tends to provide a relatively higher input torque 310 (e.g., the input torque 310 is greater than a threshold from a default value, indicating that an operator may tend to be "heavy-handed"), the electronic device 315 may increase the automated deactivation threshold or the steering torque 350, which may help to avoid an immediate trigger to switch to manual driving or may enable operation to be more personalized to the operator to enable an improved transition between automated steering (e.g., automated driving) and manual steering (e.g., automated driving).

In some approaches, the information may be obtained from a second vehicle that is spatially ahead of the vehicle. The information may indicate a driver interaction with the second vehicle. Adjusting the second torque 340, the third torque, or the steering torque 350 may include reducing the second torque 340, the third torque, or the steering torque 350 to reduce an automated steering deactivation threshold. For instance, V2X or cloud information from a vehicle ahead of the vehicle may be utilized. Information from a vehicle ahead of the vehicle may be communicated to (e.g., shared with) the vehicle. The information may be utilized for situation prediction for the vehicle (e.g., to predict a driver interaction or emergency situation, among other examples). In one example of a use case, no emergency maneuver for the vehicle ahead may be detected, but the information may indicate that the operator of the vehicle ahead is acting against the automated steering (e.g., automated driving) feature. If the operator in the vehicle ahead is interacting against the automated steering (e.g., the operator suddenly steers around an obstacle), then it may be probable that the driver in the vehicle will also be interacting. Accordingly, the second torque 340, the third torque, or the steering torque 350 (e.g., the driver interaction torque weight) may be reduced to increase ease of transitioning out of automated driving for a potential operator interaction.

In some examples, the information may be received from a second vehicle that is spatially ahead of the vehicle. The information may be indicative of an emergency maneuver. Adjusting the second torque 340, the third torque, or the steering torque 350 may include increasing the second torque 340, the third torque, or the steering torque 350 to increase an automated steering deactivation threshold. In another example of a use case, an emergency maneuver may be performed by automated steering of the vehicle ahead of the vehicle. For instance, an automated driving feature in a vehicle ahead may detect an emergency situation and may start an emergency maneuver. The vehicle may also encounter the emergency situation (e.g., safety critical situation). The second torque 340, the third torque, or the steering torque 350 (e.g., driver interaction torque weight) in the vehicle may be increased to reduce a probability of an unintentional driver interaction (which may prioritize safety over comfort in some situations).

In some approaches, the electronic device 315 (or a vehicle) may detect the input torque 310. For instance, the electronic device 315 may receive a signal from a sensor (e.g., sensor 151 as described with reference to FIG. 1)

indicating the input torque 310 or may include a sensor (e.g., sensor 151) indicating the input torque 310. The electronic device 315 (or a vehicle) may determine whether to deactivate the automated steering based on the input torque 310 and the combination of the second torque 340 and the first torque 330. For example, determining whether to deactivate the automated steering may include determining whether the input torque 310 meets or exceeds an automated steering deactivation threshold that is based on the combination of the second torque 340 and the first torque 330. Additionally, or alternatively, determining whether to deactivate the automated steering may be based on the input torque 310 and the combination of the first torque 330, the second torque 340, and the third torque (e.g., the automated steering deactivation threshold may be based on the combination of the first torque 330, the second torque 340, and the third torque in some approaches). For instance, if the input torque 310 meets or exceeds an automated steering deactivation threshold (that is based on the combination of the first torque 330, the second torque 340, and the third torque), the electronic device 315 may determine to deactivate the automated steering or to transition to manual steering.

In some examples, the electronic device 315 (or a vehicle) may transition from the steering torque 350 (e.g., for the automated steering) to the first torque 330 (e.g., for manual steering) over a time duration based on a determination to deactivate the automated steering. For instance, electronic device 315 may transition from the steering torque 350 (that includes the first torque 330, the second torque 340, or the third torque) to the first torque 330 (that is based on the characteristic power steering data 305). For instance, the first torque 330 (e.g., the first torque 330 alone) may indicate power steering without automated steering.

In some approaches, the electronic device 315 (or a vehicle) may transition (e.g., transfer) from manual steering to automated steering or automated driving. For instance, the electronic device 315 (or vehicle) may provide a behavior where automated steering or automated driving takes over from manual steering. In some aspects, the electronic device 315 (or a vehicle) may determine that the input torque 310 is less than the combination of the first torque 330 and the second torque 340 (or the third torque, for instance). The electronic device 315 (or vehicle) may transition from the input torque 310 to the steering torque 350 over a time duration in response to the determination that the input torque 310 is less than the combination of the first torque 330 and the second torque 340 (or the third torque, for instance). The input torque may be less than the combination without (e.g., due to an absence of) a hand of an operator on the steering wheel or due to relatively light input torque 310. In an example, an operator may manually steer and have full control of a vehicle. The operator may release the steering wheel or may reduce the input torque 310 to a level lower than the steering torque 350 that is based on the characteristic power steering data 305, the speed-dependent mapping 355 or the steering-dependent mapping (e.g., based on the first torque 330, the second torque 340, and the third torque). When the input torque 310 is reduced below the steering torque, a pinion angle request (from manual steering, for instance) to control a pinion angle of the vehicle may be ramped back to a pinion angle request provided by automated steering control. After the pinion angle request from the automated steering control is reached, automated steering control (e.g., automated driving control) may resume control of the vehicle. For instance, a switch may be changed to an automated driving mode. Ramping back to the pinion angle request provided by automated steering control may provide a smooth transition (e.g., a transition without a jerk).

In some approaches, the electronic device 315 (e.g., vehicle) may detect or sense a deviation from the automated steering control (e.g., pinion angle request) by the input torque 310. For instance, an operator may maintain one or more hands on the steering wheel while automated steering (e.g., ADAS) is active. The deviation may be less than an automated steering deactivation threshold (e.g., less than a threshold amount from a combination of the first torque 330, the second torque 340, or a third torque). Additionally, or alternatively, the deviation may be greater than deviation threshold (e.g., greater than a threshold amount from a combination of the first torque 330, the second torque 340, or a third torque). In some aspects, the electronic device 315 may measure or utilize the deviation to adjust (e.g., tune) the characteristic power steering data 305, the mapping 355 corresponding to the vehicle speed, or the mapping that varies with a degree of steering. For instance, if the electronic device 315 detects that the input torque deviates to a quantity beyond (e.g., overcorrects) automated steering control in a curve (e.g., deviates a threshold quantity of instances, with a threshold frequency, to a threshold amount, or a combination thereof), the electronic device 315 may increase the mapping that varies with a degree of steering to provide additional supportive torque (which may help to avoid the steering wheel feeling loose to the operator while automated steering is active, for instance). Additionally, or alternatively, if the electronic device 315 detects that the input torque deviates to a quantity under (e.g., undercorrects) automated steering control in a curve (e.g., deviates a threshold quantity of instances, with a threshold frequency, to a threshold amount, or a combination thereof), the electronic device 315 may decrease the mapping that varies with a degree of steering to reduce supportive torque (which may help to avoid the steering wheel feeling as if excessively pulling the operator's hand(s) while automated steering is active, for instance).

Some examples of the techniques described herein may detect unintended manual steering. When an operator has a hand or hands on the steering wheel and a relatively sudden direction change from automated steering (or automated driving) occurs during driving (e.g., without LKA), the input torque 310 on the steering structure may increase relatively quickly, which may activate manual driving (e.g., deactivate automated driving) unintended by the operator. In some cases, a transition (e.g., an unintentional transition) to manual driving may be prevented. In some approaches, the combination (e.g., the combination of the first torque 330, the second torque 340, or the third torque) may include an interaction torque. The interaction torque may be an additional torque utilized to adjust the steering torque 350 (e.g., the automated steering deactivation threshold). The electronic device 315 (or a vehicle) may increase the interaction torque in response to a determination that a pinion angle rate (e.g., a rate at which automated steering control or actuator is changing the steering of the vehicle) is greater than a rate threshold (e.g., a threshold for a slope of a pinion angle over time) and that a driver interaction quantity is less than an interaction threshold during the period in which automated steering is active. In some aspects, the steering torque 350 (e.g., a tunable torque weight) may be set to an increased level (e.g., by the interaction torque) such that an unintended activation of manual driving is unlikely when automated steering (e.g., automated driving) is active with no driver interaction and the pinion angle rate is greater than a threshold. When the pinion angle rate becomes less than the threshold (with a hysteresis, for instance), the previous torque weight (e.g., the steering torque 350 without the interaction torque) may be set again.

Some examples of the techniques described herein may be utilized to control (e.g., correct) LKA. LKA may be a feature that helps to maintain a vehicle in a lane (e.g., assists an operator to maintain the vehicle in a marked lane of a road). For instance, LKA may steer the vehicle within lane markers by applying a steering maneuver. In some approaches, LKA may be applied for a vehicle in ADAS level 2, where the operator may have a hand or hands on the steering wheel. It may be helpful to prevent an unintentional deactivation of automated steering (e.g., automated driving) when an LKA maneuver is performed. For instance, the automated steering (e.g., automated driving) feature may remain active during the LKA maneuver (when the operator has a hand or hands on the steering wheel, for instance), but the operator may still be able to deactivate automated steering. To prevent the driver from an unwanted deactivation of automated steering, an interaction torque may be higher for steering towards a lane center than for steering away from a lane center.

In some examples, the combination (e.g., the combination of the first torque 330, the second torque 340, or the third torque) may include an interaction torque that is higher for steering towards a center of a lane than for steering away from the center of the lane during the period in which the automated steering is active. For instance, the electronic device 315 (or a vehicle) may receive sensor information (e.g., image sensor information) that may be utilized to determine sides or edges of a lane (based on lane markers or striping, for instance), which may be utilized to determine a center of the lane. For steering toward the center of the lane, the interaction torque (e.g., the steering torque 350 or automated steering deactivation threshold that includes the interaction torque) may be higher than for steering away from the center of the lane. Utilizing a higher interaction torque towards the center of the lane may enable an operator to have a hand or hands on the steering wheel and to steer supportively back to the center of the lane. The interaction torque in the opposite direction may be lower, which may enable the operator to more easily take over from the automated steering feature. Overcorrecting the automated steering feature may still be possible, though with a larger resistance due to the higher torque towards the center of the lane, which may provide a safety aspect since the operator may confirm automated steering deactivation by overcoming the higher resistance.

In some approaches, information about the activation or direction of the LKA feature may be available to the electronic device 315 or vehicle (e.g., in a software stack). The interaction torque may utilize a different parameter based on these activation or direction of the LKA feature. Some examples of these techniques may provide a quicker response when the operator wants to take manual control of the vehicle due to a reduced or no ramp down of torque limits from a higher value towards a lower value. In some scenarios with significant safety implications, quicker manual control (e.g., even on an order of milliseconds) may be helpful.

Some examples of the techniques described herein may be utilized with an evasive LKA feature. The evasive LKA feature may steer the vehicle to reduce or avoid a collision with an object by applying a steering maneuver to steer around the object, which may have significant safety implications. In some approaches, evasive LKA may be applied for a vehicle in ADAS level 2, where the operator may have a hand or hands on the steering wheel. It may be helpful to prevent an unintentional deactivation of automated steering (e.g., automated driving) when an evasive LKA maneuver is performed. For instance, the automated steering (e.g., automated driving) feature may remain active during the evasive LKA maneuver (when the operator has a hand or hands on the steering wheel, for instance), but the operator may still be able to deactivate automated steering.

The evasive LKA maneuver may be a safety maneuver that is initiated by an automated steering feature or automated driving feature. Before an operator recognizes a hazard, deactivation of automated steering or automated driving may be unhelpful (e.g., due to a slower reaction time or a panicked reaction by an operator). To prevent the driver from an unwanted deactivation of automated steering, an interaction torque may be higher (e.g., generally increased or higher in all directions) for steering with or away from the direction provided by automated steering. The operator may confirm automated steering deactivation by overcoming the increased interaction torque.

In some examples, the combination (e.g., the combination of the first torque 330, the second torque 340, or the third torque) may include an interaction torque that is increased during an automated evasive maneuver (e.g., the evasive LKA maneuver) and during the period in which the automated steering is active.

In some approaches, the electronic device 315 may include one or more sensors (e.g., sensor(s) for detection of an environmental context). For instance, the electronic device 315 may include one or more image sensors, LIDAR, depth sensor(s) (e.g., time-of-flight cameras), accelerometers, tilt sensors, moisture sensors, temperature sensors, or other sensors. In some aspects, the image sensor(s) may be utilized to capture images of a path (e.g., road, lane markers, signs, traffic signals) or other objects (e.g., other vehicles or obstructions). In some examples, the electronic device 315 (e.g., a vehicle) may adjust the steering torque 350 (or one or more components thereof) based on data from the one or more sensors. For instance, one or more images may indicate whether a vehicle is moving towards a center or edge of a lane, or whether an obstruction is in the path of the vehicle. The electronic device 315 may adjust the characteristic power steering data 305, the first torque 330, the mapping 355 that varies with vehicle speed, the second torque 340, the mapping that varies with a degree of steering, or a steering torque 350 based on multi-modal inputs (e.g., data from one or more sensors in addition to, or alternatively from, the input torque 310 or vehicle speed 320). For instance, the sensor data may be utilized to determine whether the vehicle is steering towards a center of a lane, into a curve, or out of a curve and to control the torque(s) as described herein.

In some examples, the one or more sensors (or one or more transceivers) may be utilized to obtain operational design domain (ODD) information. ODD information may include, for example, weather, road features (e.g., terrain, curvature, or incline, among other examples), traffic, time, or other information. The electronic device 315 may adjust the characteristic power steering data 305, the first torque 330, the mapping 355 that varies with vehicle speed, the second torque 340, the mapping that varies with a degree of steering, or a steering torque 350 based on the ODD information. For instance, the electronic device 315 may reduce the steering torque 350 (e.g., autonomous steering deactivation threshold) when the ODD information indicates wet or icy roads.

For instance, the electronic device 315 (or a vehicle) may receive sensor information (e.g., image sensor information)

that may be utilized to detect an object (e.g., another vehicle, a building, road debris, or a barrier, among other examples) and determine to perform an evasive maneuver to avoid or reduce a collision with the object. For steering during the evasive maneuver, the interaction torque (e.g., the steering torque 350 or automated steering deactivation threshold that includes the interaction torque) may be higher than when an evasive maneuver is not being performed. It may still be possible for the operator to take manual control of the steering or vehicle. In ADAS level 2, for instance, the operator may have the ability to make decisions by taking over control. The higher interaction torque may be noticeable, but may not disable the operator from taking control (e.g., from deactivating automated steering or automated driving).

In some approaches, information about the activation or direction of an evasive LKA feature may be available to the electronic device 315 or vehicle (e.g., in a software stack). The interaction torque may utilize a different parameter based on these activation or direction of the evasive LKA feature. Some examples of these techniques may provide a quicker response when the operator wants to take manual control of the vehicle due to a reduced or no ramp down of torque limits from a higher value towards a lower value. In some scenarios with significant safety implications, quicker manual control (e.g., even on an order of milliseconds) may be helpful.

Some examples of the techniques described herein may operate with one or more curved scenarios. For instance, a curved scenario may be a scenario in which a vehicle is on or following a curved or banked path or road. In some steer-in-curve scenarios, for instance, an automated steering feature or automated driving feature may steer a vehicle. While in the curve, the operator may steer more into the curve (than the automated steering feature, for instance). An interaction torque may be utilized for scenario with curvature, banking, or speed in addition to the first torque 330 from the characteristic power steering data 305, which may enhance an operator experience (e.g., in addition to, or alternatively from, a capability to transition to manual steering relatively quickly and seamlessly). Accordingly, more torque may be provided for steering into curves or on banked roads. For instance, an operator may feel the characteristic power steering torque with an increased interaction torque for curves. The interaction torque may be tuned to operator preference (e.g., based on one or more inputs received from the operator as described herein).

In some steer-out-of-curve scenarios, for instance, an automated steering feature or automated driving feature may steer a vehicle. While in the curve, the operator may steer away from (or out of) the curve (than the automated steering feature, for instance). For steering out of the curve, the interaction torque may be reduced relative to steering into a curve. For example, the operator may overcome the steering torque 350 (which may include the first torque 330 from the characteristic power steering data 305, the second torque 340, or the third torque). When the input torque 310 reaches the steering torque, manual steering may be activated (e.g., automated steering may be deactivated). A self-aligning torque may direct the vehicle out of the curve, which may be natural to the operator. Accordingly, the first torque 330 (from the characteristic power steering data 305) may be active with the second torque 340 or the third torque, and the interaction torque may be reduced (or not utilized due to the self-aligning torque, for instance), where the second torque 340 or the third torque may be deactivated or released (which may provide a natural or expected steering experience for the operator, for instance).

In some examples, the combination (e.g., the combination of the first torque 330, the second torque 340, or the third torque) may include an interaction torque that is higher for steering into a curve of a path on which the vehicle is traveling than for steering out of the curve of the path. For instance, the electronic device 315 (or a vehicle) may receive sensor information (e.g., image sensor information) that may be utilized to determine path or road curvature. For steering into the curve, the interaction torque (e.g., the steering torque 350 or automated steering deactivation threshold that includes the interaction torque) may be higher than for steering out of the curve.

In some approaches, the electronic device 315 (e.g., a vehicle) may control (e.g., set, adapt, or change, among other examples), the characteristic power steering data 305, the first torque 330, the speed-dependent mapping 355, the second torque 340, the steering-dependent mapping, the third torque, or the steering torque 350 based on an ADAS level. For instance, the steering torque 350 (or one or more components thereof) may be a function of ADAS level. In some examples, the steering torque 350 may follow a first function or mapping for ADAS level 2, may follow a second function or mapping for ADAS level 3, or may follow a third function or mapping for another ADAS level (e.g., greater than level 3). For instance, the steering torque 350 (e.g., automated steering deactivation threshold) may be increased with increasing ADAS level, which may increase an amount of input torque 310 to deactivate automated steering or trigger a transition to a manual steering mode. In some examples, the electronic device 315 may determine a current ADAS level. For instance, the electronic device 315 may compare a current ADAS level to a previous ADAS level (e.g., a previous ADAS level from a period before a current time). If the current ADAS level has changed from the previous ADAS level, the electronic device 315 may control (e.g., adjust, increase a torque for, or decrease a torque for) the characteristic power steering data 305, the first torque 330, the speed-dependent mapping 355, the second torque 340, the steering-dependent mapping, the third torque, or the steering torque 350 based on the ADAS level.

Figure 4:
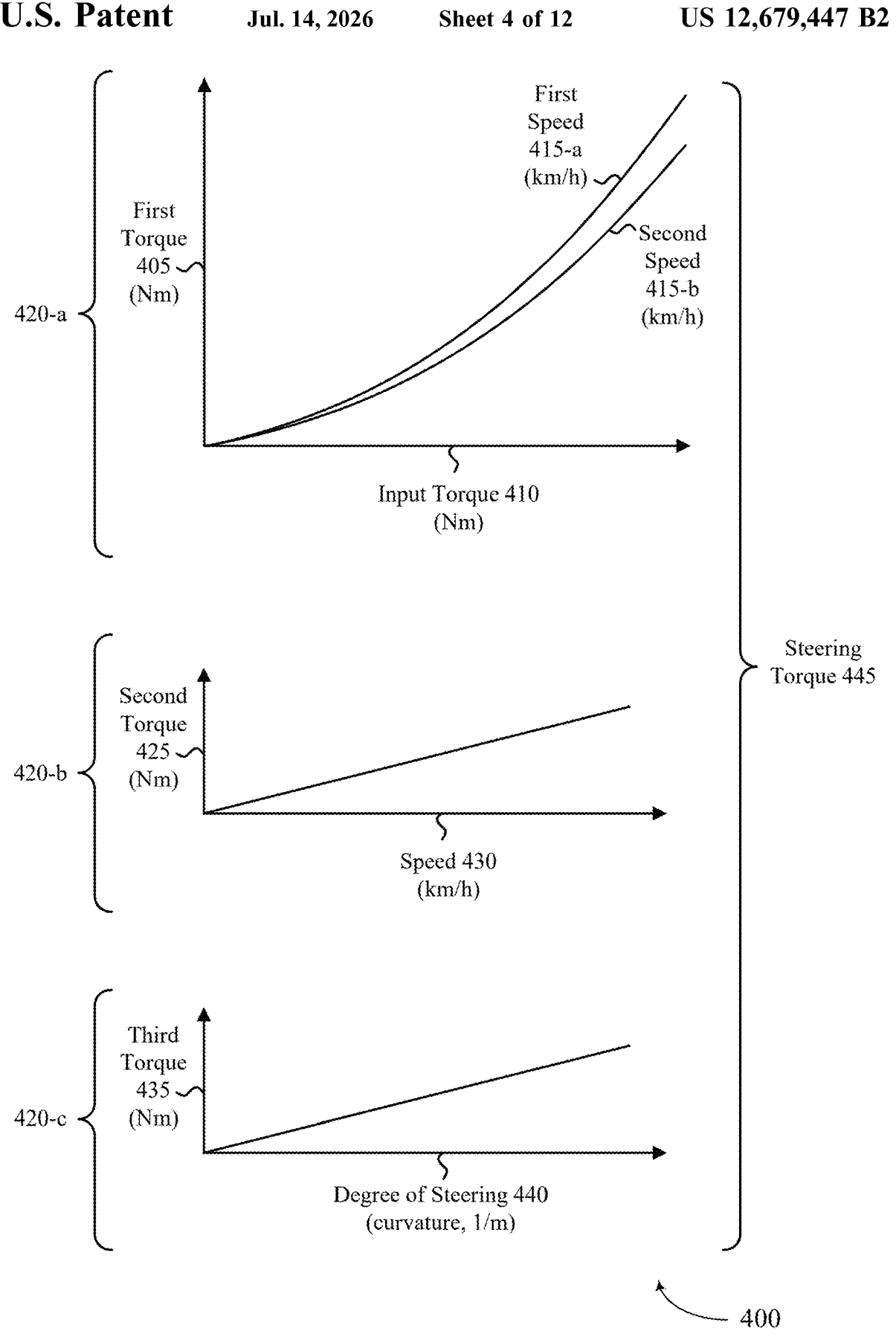
FIG. 4 shows examples of graphs that support torques for application of automated steering of vehicles in accordance with one or more aspects of the present disclosure.

FIG. 4 shows examples of graphs 400 that support torques for application of automated steering of vehicles in accordance with one or more aspects of the present disclosure. In particular, FIG. 4 includes a first graph 420-a illustrating an example of characteristic power steering data, a second graph 420-b illustrating an example of a mapping that is dependent on vehicle speed 430, and a third graph 420-c illustrating an example of a mapping that is dependent on a degree of steering 440.

The first graph 420-a is illustrated with an input torque 410 (in Newton meters (Nm)) on the horizontal axis and a first torque 405 (in Nm) on the vertical axis. The input torque 410 may be an example of the input torque 310 described with reference to FIG. 3. The first torque 405 may be an example of the first torque 330 described with reference to FIG. 3. The first graph 420-a illustrates an example of characteristic power steering data, which may be an example of the characteristic power steering data 305 described with reference to FIG. 3. In this example, the characteristic power steering data includes a first curve for a first speed 415-a (e.g., vehicle speed in kilometers per hour (km/h)) and a second curve for a second speed 415-b. The first speed 415-a or the second speed 415-b may be examples of the speed 320 described with reference to FIG. 3. While curves for two speeds are illustrated, more or fewer curves may be utilized.

For instance additional curves corresponding to additional speeds or vehicle weights may be included in characteristic power steering data. The first speed 415-*a* may be less than the second speed 415-*b*. As illustrated by the first graph 420-*a*, a first torque 405 may be determined based on an input torque 410 and a speed (e.g., first speed 415-*a* or second speed 415-*b*).

The second graph 420-*b* is illustrated with a speed 430 (in km/h) on the horizontal axis and a second torque 425 (in Nm) (e.g., a torque weight) on the vertical axis. The speed 430 may be an example of the vehicle speed 320 described with reference to FIG. 3. The second torque 425 may be an example of the second torque 340 described with reference to FIG. 3. The second graph 420-*b* illustrates an example of a mapping that varies with vehicle speed, which may be an example of the mapping 355 that varies with vehicle speed described with reference to FIG. 3. In this example, the mapping includes data relating speed 430 to the second torque 425. While the mapping is illustrated as a line or linear function, other mappings (e.g., curves or non-linear mappings, among other examples) may be utilized in other examples. For instance, the shape of the mapping may not be linear or may be determined (e.g., measured, empirically observed) with a vehicle. As illustrated by the second graph 420-*b*, a second torque 425 may be determined based on a speed 430.

The third graph 420-*c* is illustrated with a degree of steering 440 (e.g., curvature in 1/meters (1/m)) on the horizontal axis and a third torque 435 (in Nm) (e.g., a torque weight) on the vertical axis. The degree of steering 440 may be an example of the degree of steering described with reference to FIG. 3. The third torque 435 may be an example of the third torque described with reference to FIG. 3. The third graph 420-*c* illustrates an example of a mapping that varies with a degree of steering, which may be an example of the mapping that varies with the degree of steering described with reference to FIG. 3. In this example, the mapping includes data relating the degree of steering 440 to the third torque 435. While the mapping is illustrated as a line or linear function, other mappings (e.g., curves or non-linear mappings, among other examples) may be utilized in other examples. For instance, the shape of the mapping may not be linear or may be determined (e.g., measured, empirically observed) with a vehicle. As illustrated by the third graph 420-*c*, a third torque 435 may be determined based on a degree of steering 440.

In the example of FIG. 4, the first torque 405, the second torque 425, and the third torque 435 may be combined to determine a steering torque 445. For instance, the first torque 405, the second torque 425, and the third torque 435 may be summed, added, multiplied, subtracted, or divided to produce the steering torque 445. In some approaches, the first torque 405—the second torque 425 (e.g., speed-dependent torque)—the third torque 435 (e.g., curvature-dependent torque)=the steering torque 445 (e.g., supportive torque) when automated steering or automated driving is active. In some approaches, the characteristic power steering data, the mapping (that varies with vehicle speed), and the mapping (that varies with a degree of steering) may be combined to produce calculated characteristic steering data, which may be utilized to determine the steering torque 445. The steering torque 445 may be an example of the steering torque 350 described with reference to FIG. 3.

FIG. 5 shows an example of a block diagram 500 that supports torques for application of automated steering of vehicles in accordance with one or more aspects of the present disclosure. In some examples, one or more of the operations described with reference to FIG. 5 may be implemented in a vehicle 105, controller 102, processor 106, memory 104, or one or more of the other components or elements described with reference to FIG. 1. Additionally, or alternatively, one or more of the operations described with reference to FIG. 5 may be implemented in the electronic device 315 or one or more of the components or elements described with reference to FIG. 3. For instance, one or more of the components or elements described with reference to FIG. 5 may be included in a vehicle 105, a controller 102, or an electronic device 315.

FIG. 5 illustrates examples of a proportional-integral-derivative (PID) controller 510, a processor 520, a sensor 530, and a switch 545. The PID controller 510, processor 520, sensor 530, or switch 545 may be utilized in transitioning between automated steering (e.g., an automated steering mode) and manual steering (e.g., a manual steering mode). A setpoint 505 may be provided to a PID controller 510. The PID controller 510 may be integrated into, or separate from one or more of the controllers or processors described herein. The setpoint 505 may be the steering torque (e.g., steering torque 350 described with reference to FIG. 3), which may include a first torque from characteristic power steering data, a second torque from a mapping that varies with vehicle speed, or a third torque from a mapping that varies with a degree of steering. The PID controller 510 may produce a pinion angle request 515 (e.g., a PID controller output), which may be utilized to steer a vehicle. The pinion angle request 515 may be provided to the processor 520. The processor 520 may produce a process variable 525 based on the pinion angle request 515 and a disturbance 540 (e.g., a wind disturbance acting on the vehicle), if any. The process variable 525 may be provided to the sensor 530 (e.g., a torque Hall sensor). The sensor 530 may produce a steering wheel torque 535 (e.g., a measured process variable), which may be provided (e.g., fed back) to the PID controller 510.

In an example, a vehicle may transition from automated steering (e.g., automated driving) to manual steering (based on operator input, for instance). In some aspects, a pinion angle request 515-*a* (e.g., a control signal to an actuator of a steering system, such as the actuator 136 described with reference to FIG. 1) may be calculated or generated by an automated steering (e.g., automated driving) feature. A switch 545 may be utilized to control whether a pinion angle request 515-*c* is a pinion angle request 515-*a* from automated steering or a pinion angle request 515-*b* from manual steering.

As described herein, when (e.g., after) an input torque from a steering wheel is greater than the steering torque based on characteristic power steering data, a mapping that varies with vehicle speed, or a mapping that varies with a degree of steering (e.g., when operator interaction is detected), the switch may be set select the pinion angle request 515-*b* from manual steering. The pinion angle request 515 output by the PID controller 510 may start with an actual pinion angle (e.g., current pinion angle of the steering system) to provide a smooth transition (e.g., to reduce or avoid a jerk). For example, the PID controller 510 may operate (e.g., may be activated) with one or more error values. An example of an error value may be a difference between a target setpoint 505 and a measured process variable or a first torque (e.g., from characteristic power steering data)—a second torque (e.g., from a mapping that varies with vehicle speed)—a third torque (e.g., from a mapping that varies with a degree of steering)—the steering wheel torque 535 (e.g., measured process variable). The PID controller 510 may produce the pinion angle request 515, which may smoothly transition in a period of time from the steering torque (with the first torque, second torque, or third torque, for instance) to a manual steering torque (with the first torque, for instance).

Figure 6:
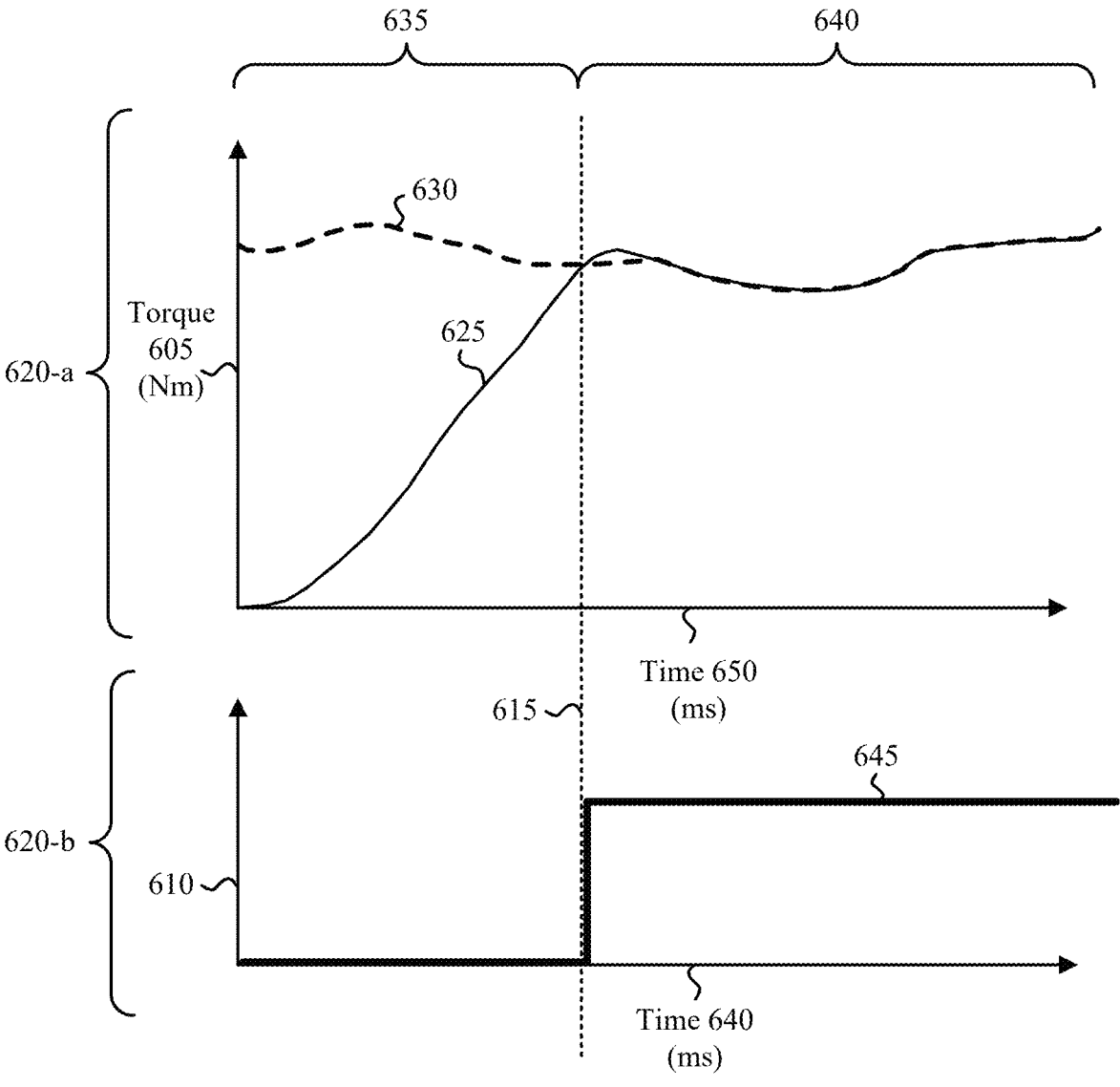
FIG. 6 shows examples of graphs that support torques for application of automated steering of vehicles in accordance with one or more aspects of the present disclosure.

FIG. 6 shows examples of graphs 600 that support torques for application of automated steering of vehicles in accordance with one or more aspects of the present disclosure. In particular, FIG. 6 includes a first graph 620-a illustrating examples of an input torque 625 (e.g., an input torque sensed from the steering wheel) and a steering torque 630 (e.g., a combination of the first torque, second torque, or third torque described herein).

The first graph 620-a is illustrated with time 650 (in milliseconds (ms)) on the horizontal axis and torque 605 (in Nm) on the vertical axis. The input torque 625 may be an example of the input torque 310 described with reference to FIG. 3. The steering torque 630 may be an example of the steering torque 350 described with reference to FIG. 3. The second graph 620-b is illustrated with time (in ms) on the horizontal axis and an operator interaction detection 610 on the vertical axis. For instance, an operator interaction signal 645 may be a binary signal that indicates when operator interaction is detected (e.g., to transition to manual steering).

FIG. 6 may illustrate an example of transitioning from automated steering (e.g., automated driving) to manual steering in accordance with some of the techniques described herein. In this example, the input torque 625 may be measured and controlled to a steering torque 630 based on a first torque (e.g., from characteristic power steering data), a second torque (e.g., from a mapping that varies with vehicle speed), or third torque (e.g., from a mapping that varies with a degree of steering). For instance, the first torque may be determined based on an input torque 625 and vehicle speed, as described with reference to FIG. 3.

During a first period 635, automated steering (e.g., automated driving) may be active and may produce a pinion angle request. During the first period 635 in this example, the input torque 625 increases until reaching the steering torque 630 at a time 615, where the steering torque 630 may be utilized as an automated steering deactivation threshold. At the time 615, the operator interaction signal 645 may switch, indicating that operator interaction has been detected and a transition to manual steering will be performed.

At or after the time 615, a PID controller (e.g., PID controller 510) may be activated. The PID controller may begin at 0 such that the steering torque 630 may be ramped from 0 towards the first torque (e.g., characteristic power steering data) value in a period. In a second period 640, the automated steering (e.g., automated driving) control may continue to be active and may produce a pinion angle request that tracks the input torque 625. Accordingly, the steering wheel may have less stiffness in the second period 640, but may handle smoothly for manual driving. During the second period 640, the operator may manually steer the vehicle (e.g., may have full control of the vehicle) until releasing the steering wheel or reducing the input torque 625 to a level smaller than the steering torque 630 (which may be based on the characteristic power steering data and one or more other torques, for instance).

Some examples of the techniques described herein may reduce or avoid a jerk in the steering wheel when transitioning that may occur in other approaches. In some approaches, for instance, an input torque may increase beyond the steering torque to a higher threshold for automated steering deactivation. Once the higher threshold is met, automated driving may be canceled the input torque may quickly transition to a power steering torque, which may result in a jerk during the transition.

Some examples of the techniques described herein may utilize a "pinion angle request" interface, which may utilize one or more signals (e.g., relatively few signals) to function (which may ease implementation, for instance). Some examples may operate with relatively little delay, which may provide fast control. Some approaches may utilize a torque limit for handling operator interaction scenarios, which may pose implementation challenges. For instance, a torque request may be outputted, which may be accessed externally via an upper- and lower torque limit (e.g., such that the value of the signal may be changed based on the limits). For example, when an automated driving feature requests a torque of 2 Nm and an upper torque limit is limited to 1 Nm, only 1 Nm may be utilized. These approaches may operate relatively slowing due to a starting controlling point (e.g., ±3 Nm), which may not initially limit the main torque request. For instance, the controlling may may initially ramp down and overshoot heavily until converging for smoother control. Accordingly, some examples of the techniques described herein may operate without a significant delay or may have a helpful controller starting set point without delay.

Some examples of the techniques described herein may provide one or more helpful safety features by detecting unintended usage. Because interactions may be carried out when automated steering or driving is active, false positives may be detected (e.g., when the operator has a hand or hands on the steering wheel and a sudden direction change occurs from automated steering or automated driving. An increased or higher torque threshold may be utilized such that the automated steering feature or automated driving feature may follow a target path. Accordingly, unintended transitions to manual steering may be avoided (e.g., not triggered).

Some examples of the techniques described herein may provide one or more safety features with a torque weight (e.g., second torque or third torque). For instance, additional torque may provide a safety feature in that steering may be experience similar to power steering with an extra tunable torque, which may indicate to an operator that that automated steering or driving is active in the background. Additionally, or alternatively, a seamless transfer may provide a more intuitive handover that may improve safety.

Some examples of the techniques described herein may enable tuning with relatively low effort or inexpensive feature growth. For instance, some examples of the techniques described herein may be based on the characteristic power steering data or a characteristic diagram, where the torque weight (e.g., second torque or third torque) may be tuned with less effort or low cost, while being less error prone.

Figure 7:
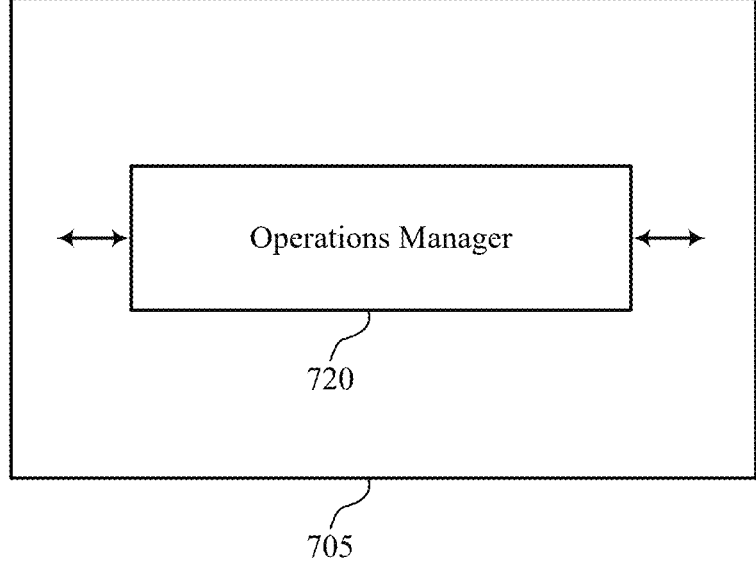
FIGS. 7 and 8 show block diagrams of devices that support torques for application of automated steering of vehicles in accordance with one or more aspects of the present disclosure.

FIG. 7 shows a block diagram 700 of a device 705 that supports torques for application of automated steering of vehicles in accordance with one or more aspects of the present disclosure. The device 705 may be an example of aspects of an electronic device as described herein. The device 705 may include an operations manager 720. The device 705, or one or more components of the device 705 (e.g., the operations manager 720), may include at least one processor, which may be coupled with at least one memory, to, individually or collectively, support or enable the described techniques. Each of these components may be in communication with one another (e.g., via one or more buses).

The operations manager 720 or various combinations or components thereof may be examples of means for performing various aspects of torques for application of automated steering of vehicles as described herein. For example, the operations manager 720 or various combinations or components thereof may be capable of performing one or more of the functions described herein.

In some examples, operations manager 720 or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, operations manager 720 or various combinations or components thereof may be implemented in code (e.g., as communications management software or firmware) executed by at least one processor (e.g., referred to as a processor-executable code). If implemented in code executed by at least one processor, the functions of operations manager 720 or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the operations manager 720 may be configured to perform various operations (e.g., controlling, computing, calculating, receiving, obtaining, monitoring, outputting, transmitting) using or otherwise in cooperation with one or more other components. For example, the operations manager 720 may receive information, send information, or be integrated in combination one or more other components to obtain information, output information, or perform various other operations as described herein.

For example, the operations manager 720 is capable of, configured to, or operable to support a means for determining a first torque from characteristic power steering data based on an input torque to a steering wheel of a vehicle and a speed of the vehicle. The operations manager 720 is capable of, configured to, or operable to support a means for determining a second torque based on a mapping that varies with vehicle speed. The operations manager 720 is capable of, configured to, or operable to support a means for determining a steering torque based on a combination of the first torque from the characteristic power steering data and the second torque. The operations manager 720 is capable of, configured to, or operable to support a means for applying the steering torque to the steering structure of the vehicle during a period in which automated steering is active. The steering torque that is based on the second torque (or a third torque) may indicate that the automated steering is active.

By including or configuring the operations manager 720 in accordance with examples as described herein, the device 705 (e.g., the operations manager 720) may support techniques for reduced processing, reduced power consumption, or more efficient utilization of communication resources.

Figure 8:
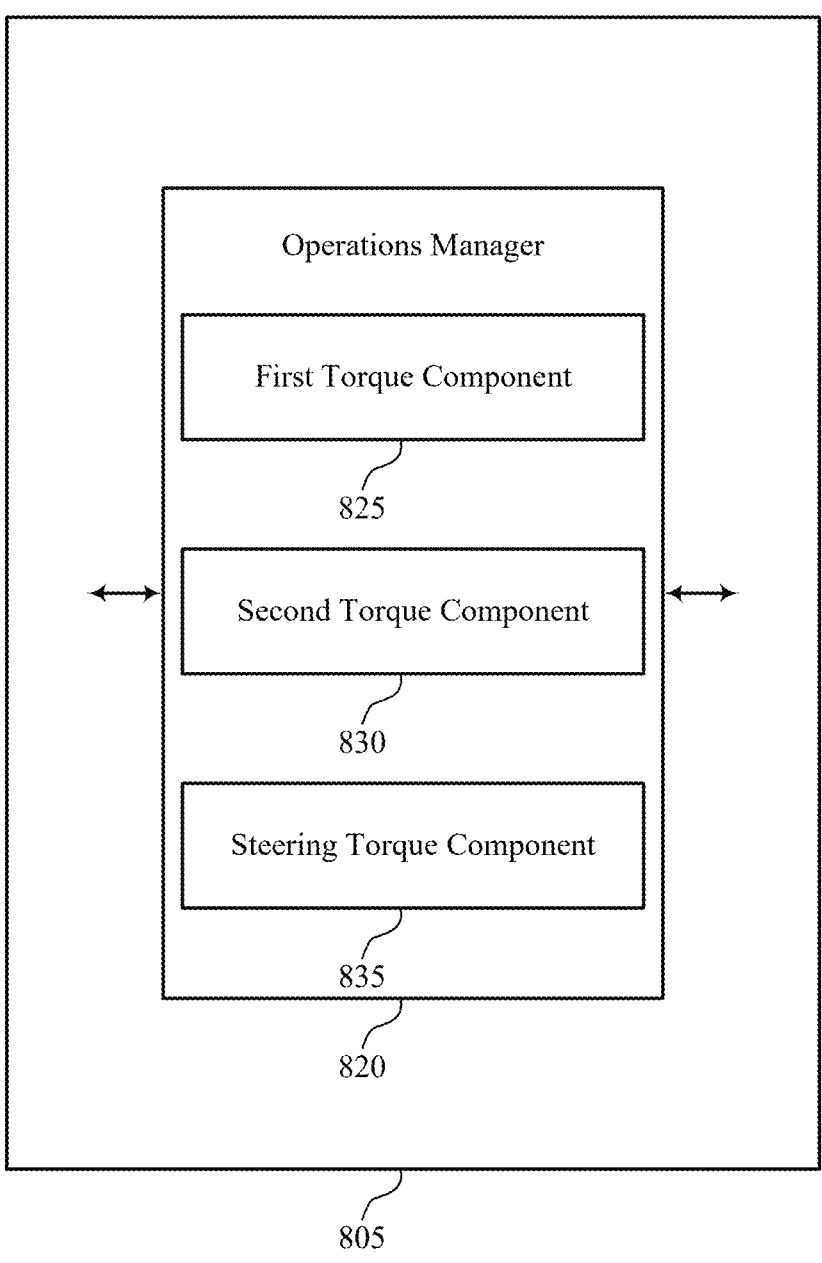

FIG. 8 shows a block diagram 800 of a device 805 that supports torques for application of automated steering of vehicles in accordance with one or more aspects of the present disclosure. The device 805 may be an example of aspects of a device 705 or an electronic device (e.g., electronic device 315) as described herein. The device 805 may include an operations manager 820. The device 805, or one or more components of the device 805 (e.g., the operations manager 820), may include at least one processor, which may be coupled with at least one memory, to support the described techniques. Each of these components may be in communication with one another (e.g., via one or more buses).

The device 805, or various components thereof, may be an example of means for performing various aspects of torques for application of automated steering of vehicles as described herein. For example, the operations manager 820 may include a first torque component 825, a second torque component 830, a steering torque component 835, or any combination thereof. The operations manager 820 may be an example of aspects of an operations manager 720 as described herein. In some examples, the operations manager 820, or various components thereof, may be configured to perform various operations (e.g., controlling, calculating, computing, receiving, obtaining, monitoring, outputting, transmitting) using or otherwise in cooperation with one or more other components. For example, the operations manager 820 may receive information, send information, or be integrated in combination with one or more other components to obtain information, output information, or perform various other operations as described herein.

The first torque component 825 is capable of, configured to, or operable to support a means for determining a first torque from characteristic power steering data based on an input torque to a steering wheel of a vehicle and a speed of the vehicle. The second torque component 830 is capable of, configured to, or operable to support a means for determining a second torque based on a mapping that varies with vehicle speed. The steering torque component 835 is capable of, configured to, or operable to support a means for determining a steering torque based on a combination of the first torque from the characteristic power steering data and the second torque. The steering torque component 835 is capable of, configured to, or operable to support a means for applying the steering torque to the steering structure of the vehicle during a period in which automated steering is active. The steering torque that is based on the second torque may indicate that the automated steering is active.

Figure 9:
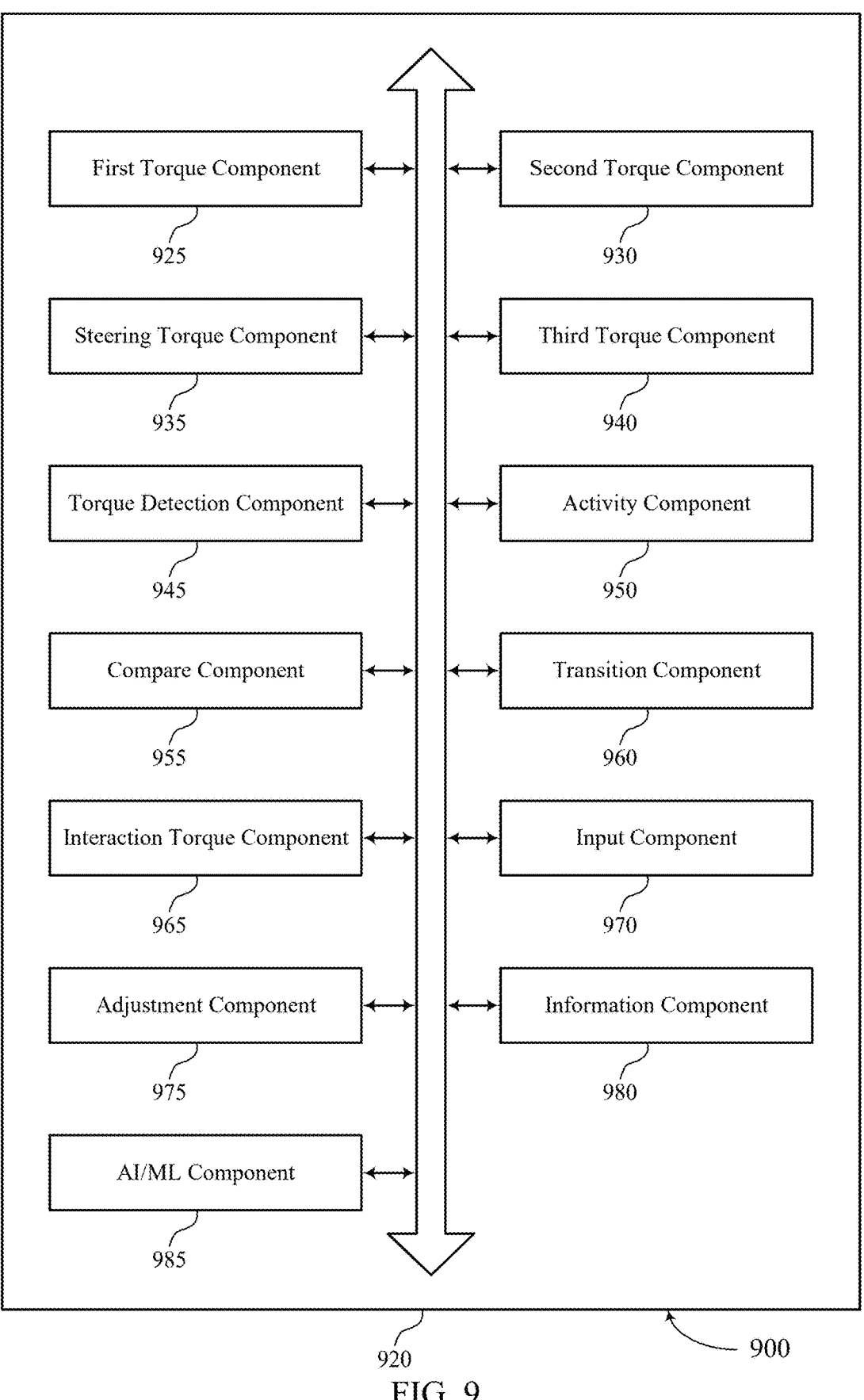
FIG. 9 shows a block diagram of an operations manager that supports torques for application of automated steering of vehicles in accordance with one or more aspects of the present disclosure.

FIG. 9 shows a block diagram 900 of an operations manager 920 that supports torques for application of automated steering of vehicles in accordance with one or more aspects of the present disclosure. The operations manager 920 may be an example of aspects of an operations manager 720, an operations manager 820, or both, as described herein. The operations manager 920, or various components thereof, may be an example of means for performing various aspects of torques for application of automated steering of vehicles as described herein. For example, the operations manager 920 may include a first torque component 925, a second torque component 930, a steering torque component 935, a third torque component 940, a torque detection component 945, an activity component 950, a compare component 955, a transition component 960, an interaction torque component 965, an input component 970, an adjustment component 975, an information component 980, an AI/ML component 985, or any combination thereof. Each of these components, or components or subcomponents thereof (e.g., one or more processors, one or more memories), may communicate, directly or indirectly, with one another (e.g., via one or more buses).

The first torque component 925 is capable of, configured to, or operable to support a means for determining a first torque from characteristic power steering data based on an input torque to a steering wheel of a vehicle and a speed of the vehicle. The second torque component 930 is capable of, configured to, or operable to support a means for determining a second torque based on a mapping that varies with vehicle speed. The steering torque component 935 is capable of, configured to, or operable to support a means for determining a steering torque based on a combination of the first torque from the characteristic power steering data and the second torque. In some examples, the steering torque component 935 is capable of, configured to, or operable to support a means for applying the steering torque to a steering structure of the vehicle during a period in which automated steering is active. The steering torque that is based on the second torque may indicate that the automated steering is active.

In some examples, the third torque component 940 is capable of, configured to, or operable to support a means for determining a third torque based on a mapping that varies with a degree of steering, where the combination for determining the steering torque further includes the third torque.

In some examples, the input component 970 is capable of, configured to, or operable to support a means for obtaining an input via an input device for adjusting the mapping that varies with vehicle speed, the mapping that varies with the degree of steering, or the combination for determining the steering torque. In some examples, the adjustment component 975 is capable of, configured to, or operable to support a means for adjusting the mapping that varies with vehicle speed, the mapping that varies with the degree of steering, or the combination based on the input.

In some examples, the adjustment component 975 is capable of, configured to, or operable to support a means for comparing a current ADAS level to a previous ADAS level. In some examples, the adjustment component 975 is capable of, configured to, or operable to support a means for adjusting the first torque, the second torque, or the steering torque based on a change in the current ADAS level from the previous ADAS level.

In some examples, the adjustment component 975 is capable of, configured to, or operable to support a means for adjusting, based at least in part on an input or driving variability associated with an operator, the first torque, the second torque, the mapping that varies with vehicle speed, a mapping that varies with a degree of steering, a third torque that is based at least in part on a mapping that varies with a degree of steering, the steering torque, or a combination thereof.

In some examples, the AI/ML component 985 is capable of, configured to, or operable to support a means for executing an AI/ML model based on the speech signal to determine an adjustment to the mapping that varies with vehicle speed, to the mapping that varies with the degree of steering, or to the combination.

In some examples, the information component 980 is capable of, configured to, or operable to support a means for obtaining information from a device that is external to the vehicle. In some examples, the adjustment component 975 is capable of, configured to, or operable to support a means for adjusting the second torque, the third torque, or the steering torque based on the information.

In some examples, the information is obtained from a second vehicle that is spatially ahead of the vehicle, the information indicating a driver interaction with the second vehicle. In some examples, adjusting the second torque, the third torque, or the steering torque includes reducing the second torque, the third torque, or the steering torque to reduce an automated steering deactivation threshold.

In some examples, the information is received from a second vehicle that is spatially ahead of the vehicle, the information indicative of an emergency maneuver. In some examples, adjusting the second torque, the third torque, or the steering torque includes increasing the second torque, the third torque, or the steering torque to increase an automated steering deactivation threshold.

In some examples, the torque detection component 945 is capable of, configured to, or operable to support a means for detecting the input torque. In some examples, the activity component 950 is capable of, configured to, or operable to support a means for determining whether to deactivate the automated steering based on the input torque and the combination of the second torque and the first torque.

In some examples, determining whether to deactivate the automated steering includes determining whether the input torque meets or exceeds an automated steering deactivation threshold that is based on the combination of the second torque and the first torque.

In some examples, the transition component 960 is capable of, configured to, or operable to support a means for transitioning from the steering torque (e.g., for the automated steering) to the first torque (e.g., for manual steering) over a time duration based on a determination to deactivate the automated steering.

In some examples, the compare component 955 is capable of, configured to, or operable to support a means for determining that the input torque is less than the combination of the first torque and the second torque. In some examples, the transition component 960 is capable of, configured to, or operable to support a means for transitioning from the input torque to the steering torque over a time duration in response to the determination that the input torque is less than the combination of the first torque and the second torque. The input torque may be less than the combination without (e.g., due to an absence of) a hand of an operator on the steering wheel.

In some examples, to support method, the interaction torque component 965 is capable of, configured to, or operable to support a means for increasing the interaction torque in response to a determination that a pinion angle rate is greater than a rate threshold and that a driver interaction quantity is less than an interaction threshold during the period in which the automated steering is active.

In some examples, the combination further includes an interaction torque that is higher for steering towards a center of a lane than for steering away from the center of the lane during the period in which the automated steering is active.

In some examples, the combination further includes an interaction torque that is increased during an automated evasive maneuver and during the period in which the automated steering is active.

In some examples, the combination further includes an interaction torque that is higher for steering into a curve of a path on which the vehicle is traveling than for steering out of the curve of the path.

Figure 10:
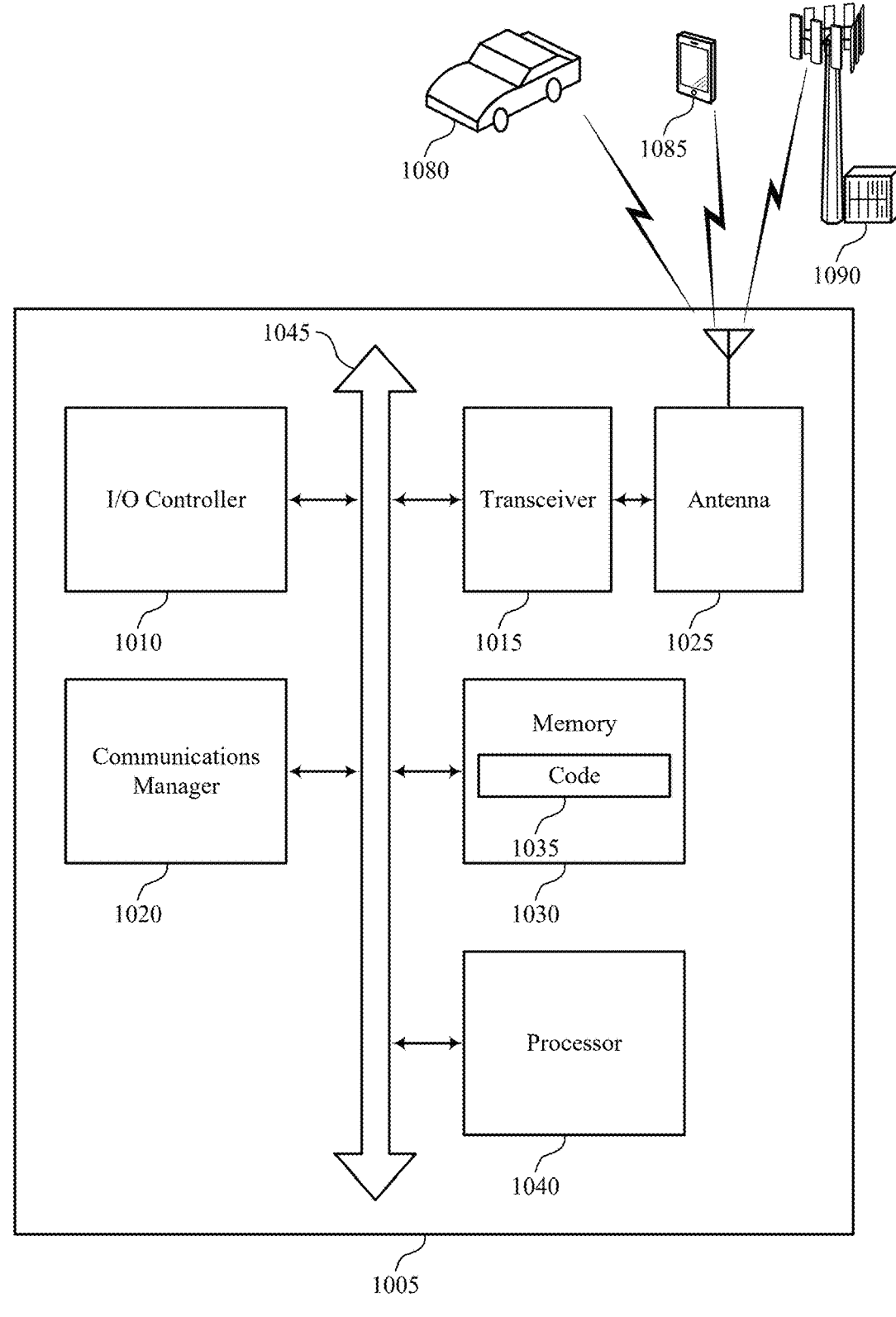
FIG. 10 shows a diagram of a system including a device that supports torques for application of automated steering of vehicles in accordance with one or more aspects of the present disclosure.

FIG. 10 shows a diagram of a system 1000 including a device 1005 that supports torques for application of automated steering of vehicles in accordance with one or more aspects of the present disclosure. The device 1005 may be an example of or include components of a device 705, a device 805, or an electronic device as described herein. The device 1005 may include components for bi-directional communications including components for transmitting and receiving communications, such as an operations manager 1020, an I/O controller, such as an I/O controller 1010, a transceiver 1015, one or more antennas 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of one or more processors, such as the at least one processor 1040. In some cases, a user may interact with the device 1005 via the I/O controller 1010 or via hardware components controlled by the I/O controller 1010.

In some cases, the device 1005 may include a single antenna. However, in some other cases, the device 1005 may have more than one antenna, which may be capable of concurrently transmitting or receiving multiple wireless transmissions. The transceiver 1015 may communicate bi-directionally via the one or more antennas 1025 using wired or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. In some examples, the device may communicate with one or more other devices, such as a vehicle 1080, a wireless device 1085, or a base station 1090.

The at least one memory 1030 may include RAM and ROM. The at least one memory 1030 may store computer-readable, computer-executable, or processor-executable code, such as the code 1035. The code 1035 may include instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may include, among other things, a BIOS which may control basic hardware or software operation such as the interaction with peripheral components or devices.

The at least one processor 1040 may include one or more intelligent hardware devices (e.g., one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in a memory (e.g., the at least one memory 1030) to cause the device 1005 to perform various functions (e.g., functions or tasks supporting torques for application of automated steering of vehicles). For example, the device 1005 or a component of the device 1005 may include at least one processor 1040 and at least one memory 1030 coupled with or to the at least one processor 1040, the at least one processor 1040 and the at least one memory 1030 configured to perform various functions described herein.

In some examples, the at least one processor 1040 may include multiple processors and the at least one memory 1030 may include multiple memories. One or more of the multiple processors may be coupled with one or more of the multiple memories, which may, individually or collectively, be configured to perform various functions described herein. In some examples, the at least one processor 1040 may be a component of a processing system, which may refer to a system (such as a series) of machines, circuitry (including, for example, one or both of processor circuitry (which may include the at least one processor 1040) and memory circuitry (which may include the at least one memory 1030)), or components, that receives or obtains inputs and processes the inputs to produce, generate, or obtain a set of outputs. The processing system may be configured to perform one or more of the functions described herein. For example, the at least one processor 1040 or a processing system including the at least one processor 1040 may be configured to, configurable to, or operable to cause the device 1005 to perform one or more of the functions described herein. Further, as described herein, being "configured to," being "configurable to," and being "operable to" may be used interchangeably and may be associated with a capability, when executing code 1035 (e.g., processor-executable code) stored in the at least one memory 1030 or otherwise, to perform one or more of the functions described herein.

For example, the operations manager 1020 is capable of, configured to, or operable to support a means for determining a first torque from characteristic power steering data based on an input torque to a steering wheel of a vehicle and a speed of the vehicle. The operations manager 1020 is capable of, configured to, or operable to support a means for determining a second torque based on a mapping that varies with vehicle speed. The operations manager 1020 is capable of, configured to, or operable to support a means for determining a steering torque based on a combination of the first torque from the characteristic power steering data and the second torque. The operations manager 1020 is capable of, configured to, or operable to support a means for applying the steering torque to a steering structure of the vehicle during a period in which automated steering is active. The steering torque that is based on the second torque may indicate that the automated steering is active.

By including or configuring the operations manager 1020 in accordance with examples as described herein, the device 1005 may support techniques for improved driving control, improved safety, improved user experience related to driving control, or improved utilization of processing capability.

In some examples, the operations manager 1020 may be configured to perform various operations (e.g., receiving, monitoring, transmitting) using or otherwise in cooperation with the transceiver 1015, the one or more antennas 1025, or any combination thereof. Although the operations manager 1020 is illustrated as a separate component, in some examples, one or more functions described with reference to the operations manager 1020 may be supported by or performed by the at least one processor 1040, the at least one memory 1030, the code 1035, or any combination thereof. For example, the code 1035 may include instructions executable by the at least one processor 1040 to cause the device 1005 to perform various aspects of torques for application of automated steering of vehicles as described herein, or the at least one processor 1040 and the at least one memory 1030 may be otherwise configured to, individually or collectively, perform or support such operations.

FIG. 11 shows a flowchart illustrating a method 1100 that supports torques for application of automated steering of vehicles in accordance with one or more aspects of the present disclosure. The operations of the method 1100 may be implemented by an electronic device or its components as described herein. For example, the operations of the method 1100 may be performed by an electronic device as described with reference to FIGS. 1 through 10. In some examples, an electronic device may execute a set of instructions to control the functional elements of the electronic device to perform the described functions. Additionally, or alternatively, the electronic device may perform aspects of the described functions using special-purpose hardware.

At 1105, the method may include determining a first torque from characteristic power steering data based on an input torque to a steering wheel of a vehicle and a speed of the vehicle. The operations of 1105 may be performed in accordance with examples as disclosed herein. In some examples, aspects of the operations of 1105 may be performed by a first torque component 925 as described with reference to FIG. 9.

At 1110, the method may include determining a second torque based on a mapping that varies with vehicle speed. The operations of 1110 may be performed in accordance with examples as disclosed herein. In some examples, aspects of the operations of 1110 may be performed by a second torque component 930 as described with reference to FIG. 9.

At 1115, the method may include determining a steering torque based on a combination of the first torque from the characteristic power steering data and the second torque. The operations of 1115 may be performed in accordance with examples as disclosed herein. In some examples, aspects of the operations of 1115 may be performed by a steering torque component 935 as described with reference to FIG. 9.

At 1120, the method may include applying the steering torque to a steering structure of the vehicle during a period in which automated steering is active. The steering torque that is based on the second torque may indicate that the automated steering is active. The operations of 1120 may be performed in accordance with examples as disclosed herein. In some examples, aspects of the operations of 1120 may be performed by a steering torque component 935 as described with reference to FIG. 9.

Figure 12:
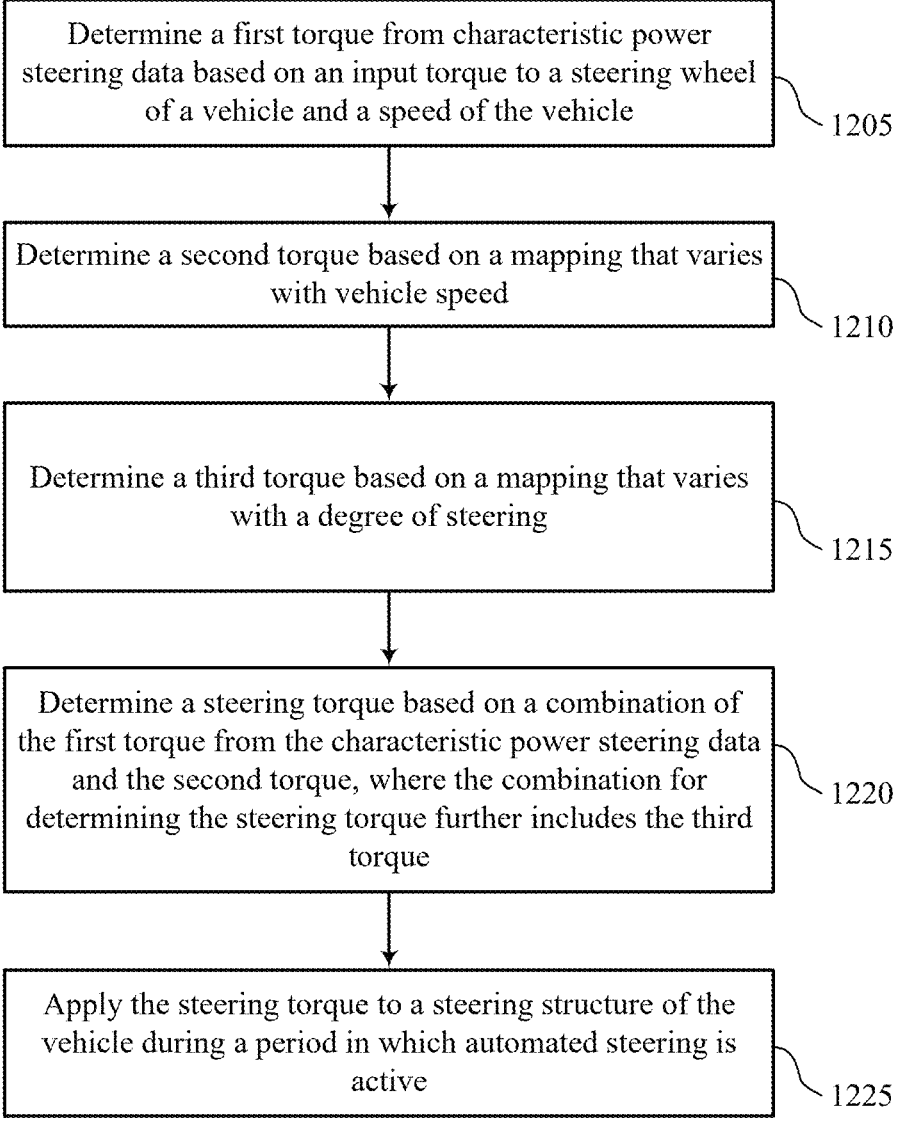

FIG. 12 shows a flowchart illustrating a method 1200 that supports torques for application of automated steering of vehicles in accordance with one or more aspects of the present disclosure. The operations of the method 1200 may be implemented by an electronic device or its components as described herein. For example, the operations of the method 1200 may be performed by an electronic device as described with reference to FIGS. 1 through 10. In some examples, an electronic device may execute a set of instructions to control the functional elements of the electronic device to perform the described functions. Additionally, or alternatively, the electronic device may perform aspects of the described functions using special-purpose hardware.

At 1205, the method may include determining a first torque from characteristic power steering data based on an input torque to a steering wheel of a vehicle and a speed of the vehicle. The operations of 1205 may be performed in accordance with examples as disclosed herein. In some examples, aspects of the operations of 1205 may be performed by a first torque component 925 as described with reference to FIG. 9.

At 1210, the method may include determining a second torque based on a mapping that varies with vehicle speed. The operations of 1210 may be performed in accordance with examples as disclosed herein. In some examples, aspects of the operations of 1210 may be performed by a second torque component 930 as described with reference to FIG. 9.

At 1215, the method may include determining a third torque based on a mapping that varies with a degree of steering. The operations of 1215 may be performed in accordance with examples as disclosed herein. In some examples, aspects of the operations of 1215 may be performed by a third torque component 940 as described with reference to FIG. 9.

At 1220, the method may include determining a steering torque based on a combination of the first torque from the characteristic power steering data and the second torque, where the combination for determining the steering torque further includes the third torque. The operations of 1220 may be performed in accordance with examples as disclosed herein. In some examples, aspects of the operations of 1220 may be performed by a steering torque component 935 as described with reference to FIG. 9.

At 1225, the method may include applying the steering torque to a steering structure of the vehicle during a period in which automated steering is active. The steering torque that is based on the second torque may indicate that the automated steering is active. The operations of 1225 may be performed in accordance with examples as disclosed herein. In some examples, aspects of the operations of 1225 may be performed by a steering torque component 935 as described with reference to FIG. 9.

The following provides an overview of aspects of the present disclosure:

Aspect 1: A method, comprising: determining a first torque from characteristic power steering data based at least in part on an input torque to a steering wheel of a vehicle and a speed of the vehicle; determining a second torque based at least in part on a mapping that varies with vehicle speed; determining a steering torque based at least in part on a combination of the first torque from the characteristic power steering data and the second torque; and applying the steering torque to a steering structure of the vehicle during a period in which automated steering is active, where the steering torque that is based at least in part on the second torque may indicate that the automated steering is active.

Aspect 2: The method of aspect 1, further comprising: determining a third torque based at least in part on a mapping that varies with a degree of steering, wherein the combination for determining the steering torque further includes the third torque.

Aspect 3: The method of aspect 2, further comprising: obtaining an input via an input device for adjusting the mapping that varies with vehicle speed, the mapping that varies with the degree of steering, or the combination for determining the steering torque; and adjusting the mapping that varies with vehicle speed, the mapping that varies with the degree of steering, or the combination based at least in part on the input.

Aspect 4: The method of aspect 3, wherein the input is a speech signal, the method further comprising: executing an AI/ML model based at least in part on the speech signal to determine an adjustment to the mapping that varies with vehicle speed, to the mapping that varies with the degree of steering, or to the combination.

Aspect 5: The method of any of aspects 2 through 4, further comprising: obtaining information from a device that is external to the vehicle; and adjusting the second torque, the third torque, or the steering torque based at least in part on the information.

Aspect 6: The method of aspect 5, wherein the information is obtained from a second vehicle that is spatially ahead of the vehicle, the information indicating a driver interaction with the second vehicle, wherein adjusting the second torque, the third torque, or the steering torque comprises reducing the second torque, the third torque, or the steering torque to reduce an automated steering deactivation threshold.

Aspect 7: The method of aspect 5, wherein the information is received from a second vehicle that is spatially ahead of the vehicle, the information indicative of an emergency maneuver, wherein adjusting the second torque, the third torque, or the steering torque comprises increasing the second torque, the third torque, or the steering torque to increase an automated steering deactivation threshold.

Aspect 8: The method of any of aspects 1 through 7, further comprising: detecting the input torque; and determining whether to deactivate the automated steering based at least in part on the input torque and the combination of the second torque and the first torque.

Aspect 9: The method of aspect 8, wherein determining whether to deactivate the automated steering comprises determining whether the input torque meets or exceeds an automated steering deactivation threshold that is based at least in part on the combination of the second torque and the first torque.

Aspect 10: The method of any of aspects 8 through 9, further comprising: transitioning from the steering torque for the automated steering to the first torque for manual steering over a time duration based at least in part on a determination to deactivate the automated steering.

Aspect 11: The method of any of aspects 1 through 10, further comprising: determining that the input torque is less than the combination of the first torque and the second torque; and transitioning from the input torque to the steering torque over a time duration in response to the determination that the input torque is less than the combination of the first torque and the second torque, wherein the input torque is less than the combination without a hand of an operator on the steering wheel.

Aspect 12: The method of any of aspects 1 through 11, wherein the combination further comprises an interaction torque, and wherein the method further comprises: increasing the interaction torque in response to a determination that a pinion angle rate is greater than a rate threshold and that a driver interaction quantity is less than an interaction threshold during the period in which the automated steering is active.

Aspect 13: The method of any of aspects 1 through 12, wherein the combination further comprises an interaction torque that is higher for steering towards a center of a lane than for steering away from the center of the lane during the period in which the automated steering is active.

Aspect 14: The method of any of aspects 1 through 13, wherein the combination further comprises an interaction torque that is increased during an automated evasive maneuver and during the period in which the automated steering is active.

Aspect 15: The method of any of aspects 1 through 14, wherein the combination further comprises an interaction torque that is higher for steering into a curve of a path on which the vehicle is traveling than for steering out of the curve of the path.

Aspect 16: The method of any of aspects 1 through 15, further comprising: comparing a current ADAS level to a previous ADAS level; and controlling the first torque, the second torque, or the steering torque based at least in part on a change in the current ADAS level from the previous ADAS level.

Aspect 17: The method of any of aspects 1 through 16, further comprising: adjusting, based at least in part on an input or a driving variability associated with an operator, the first torque, the second torque, the mapping that varies with vehicle speed, a mapping that varies with a degree of steering, a third torque that is based at least in part on a mapping that varies with a degree of steering, the steering torque, or a combination thereof.

Aspect 18: An apparatus comprising one or more memory and one or more processors electronically coupled to the one or more memory, the one or more processors configured to perform a method of any of aspects 1 through 17.

Aspect 19: An apparatus comprising at least one means for performing a method of any of aspects 1 through 17.

Aspect 20: A non-transitory computer-readable medium storing code the code comprising instructions executable by one or more processors to perform a method of any of aspects 1 through 17.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:

one or more memory; and one or more processors electronically coupled to the one or more memory, the one or more processors configured to:

determine a first torque from characteristic power steering data based at least in part on an input torque to a steering wheel of a vehicle and a speed of the vehicle;

determine a second torque based at least in part on a mapping that varies with vehicle speed;

determine a steering torque based at least in part on a combination of the first torque from the characteristic power steering data and the second torque; and apply the steering torque to a steering structure of the vehicle during a period in which automated steering is active, wherein the steering torque that is based at least in part on the second torque indicates that the automated steering is active.

2. The apparatus of claim 1, wherein the one or more processors are further configured to:

determine a third torque based at least in part on a mapping that varies with a degree of steering, wherein the combination for determining the steering torque further includes the third torque.

3. The apparatus of claim 2, wherein the one or more processors are further configured to:

obtain an input via an input device for adjusting the mapping that varies with vehicle speed, the mapping that varies with the degree of steering, or the combination for determining the steering torque; and adjust the mapping that varies with vehicle speed, the mapping that varies with the degree of steering, or the combination based at least in part on the input.

4. The apparatus of claim 3, wherein the input is a speech signal, and wherein the one or more processors are further configured to:

execute an artificial intelligence or machine learning (AI/ML) model based at least in part on the speech signal to determine an adjustment to the mapping that varies with vehicle speed, to the mapping that varies with the degree of steering, or to the combination.

5. The apparatus of claim 2, wherein the one or more processors are further configured to:

obtain information from a device that is external to the vehicle; and adjust the second torque, the third torque, or the steering torque based at least in part on the information.

6. The apparatus of claim 5, wherein the information is obtained from a second vehicle that is spatially ahead of the vehicle, the information indicating a driver interaction with the second vehicle, and wherein, to adjust the second torque, the third torque, or the steering torque, the one or more processors are configured to reduce the second torque, the third torque, or the steering torque to reduce an automated steering deactivation threshold.

7. The apparatus of claim 5, wherein the information is received from a second vehicle that is spatially ahead of the vehicle, the information indicative of an emergency maneuver, and wherein, to adjust the second torque, the third torque, or the steering torque, the one or more processors are configured to increase the second torque, the third torque, or the steering torque to increase an automated steering deactivation threshold.

8. The apparatus of claim 1, wherein the one or more processors are further configured to:

detect the input torque; and determine whether to deactivate the automated steering based at least in part on the input torque and the combination of the second torque and the first torque.

9. The apparatus of claim 8, wherein determining whether to deactivate the automated steering comprises determining whether the input torque meets or exceeds an automated steering deactivation threshold that is based at least in part on the combination of the second torque and the first torque.

10. The apparatus of claim 8, wherein the one or more processors are further configured to:

transition from the steering torque for the automated steering to the first torque for manual steering over a time duration based at least in part on a determination to deactivate the automated steering.

11. A method, comprising:

determining a first torque from characteristic power steering data based at least in part on an input torque to a steering wheel of a vehicle and a speed of the vehicle;

determining a second torque based at least in part on a mapping that varies with vehicle speed;

determining a steering torque based at least in part on a combination of the first torque from the characteristic power steering data and the second torque; and applying the steering torque to a steering structure of the vehicle during a period in which automated steering is active, wherein the steering torque that is based at least in part on the second torque indicates that the automated steering is active.

12. The method of claim 11, further comprising:

detecting the input torque; and determining whether to deactivate the automated steering based at least in part on the input torque and the combination of the second torque and the first torque.

13. The method of claim 11, further comprising:

adjusting, based at least in part on an input or a driving variability associated with an operator, the first torque, the second torque, the mapping that varies with vehicle speed, a mapping that varies with a degree of steering, a third torque that is based at least in part on a mapping that varies with a degree of steering, the steering torque, or a combination thereof.

14. The method of claim 11, further comprising:

comparing a current advanced driver assistance system (ADAS) level to a previous ADAS level; and adjusting the first torque, the second torque, or the steering torque based at least in part on a change in the current ADAS level from the previous ADAS level.

15. The method of claim 11, further comprising:

determining that the input torque is less than the combination of the first torque and the second torque; and transitioning from the input torque to the steering torque over a time duration in response to the determination that the input torque is less than the combination of the first torque and the second torque, wherein the input torque is less than the combination without a hand of an operator on the steering wheel.

16. The method of claim 11, wherein the combination further comprises an interaction torque, and wherein the method further comprises:

increasing the interaction torque in response to a determination that a pinion angle rate is greater than a rate threshold and that a driver interaction quantity is less than an interaction threshold during the period in which the automated steering is active.

17. The method of claim 11, wherein the combination further comprises an interaction torque that is higher for steering towards a center of a lane than for steering away from the center of the lane during the period in which the automated steering is active.

18. The method of claim 11, wherein the combination further comprises an interaction torque that is increased during an automated evasive maneuver and during the period in which the automated steering is active.

19. The method of claim 11, wherein the combination further comprises an interaction torque that is higher for steering into a curve of a path on which the vehicle is traveling than for steering out of the curve of the path.

20. An apparatus, comprising:

means for determining a first torque from characteristic power steering data based at least in part on an input torque to a steering wheel of a vehicle and a speed of the vehicle;

means for determining a second torque based at least in part on a mapping that varies with vehicle speed;

means for determining a steering torque based at least in part on a combination of the first torque from the characteristic power steering data and the second torque; and means for applying the steering torque to a steering structure of the vehicle during a period in which automated steering is active, wherein the steering torque that is based at least in part on the second torque indicates that the automated steering is active.

* * * * *